United States Patent [19]

Giblet

[11] Patent Number: 4,907,728
[45] Date of Patent: Mar. 13, 1990

[54] VEHICLE MOUNTABLE LUGGAGE CARRIER ASSEMBLY

[76] Inventor: Allen L. Giblet, 137 Quail Dr., Cordell, Okla. 73632

[21] Appl. No.: 100,568

[22] Filed: Sep. 24, 1987

[51] Int. Cl.⁴ .............................................. B60R 9/06
[52] U.S. Cl. .......................... 224/42.03 A; 224/42.44; 190/18 A; 190/19; 190/127
[58] Field of Search ................. 224/42.03 R, 42.03 A, 224/42.07, 42.08, 42.43, 42.44, 310; 220/84, 19, DIG. 14; 5/118, 119; 108/44; 280/767, 769; 190/18 A, 125, 23, 24, 124, 127, 19

[56] References Cited

U.S. PATENT DOCUMENTS

| | | |
|---|---|---|
| 915,802 | 3/1909 | Smith ....................................... 190/24 |
| 1,280,761 | 10/1918 | Kirkpatrick et al. . |
| 1,292,452 | 1/1919 | Friedman ...................... 224/42.43 X |
| 1,487,974 | 3/1924 | Prouty .............................. 224/42.44 |
| 1,503,083 | 7/1924 | Amey et al. . |
| 1,569,600 | 1/1926 | Allbright ................................. 5/119 |
| 1,593,583 | 7/1926 | Long et al. ............................. 5/119 |
| 1,712,612 | 5/1929 | Halladay ............................... 190/19 |
| 1,797,229 | 3/1931 | Giffel .................................... 5/119 |
| 1,828,128 | 10/1931 | Criner .............................. 224/42.44 |
| 1,915,114 | 6/1933 | Awes . |
| 1,917,777 | 7/1933 | Scott ....................................... 5/119 |
| 2,069,345 | 2/1937 | Widman . |
| 2,071,644 | 2/1937 | McBrady ............................ 5/119 X |
| 2,541,244 | 2/1951 | Hack . |
| 2,593,908 | 4/1952 | Monteverde .................. 224/42.44 X |
| 2,797,178 | 6/1957 | Noyes et al. ........... 220/DIG. 14 X |
| 2,848,271 | 8/1958 | Reilly . |
| 2,907,483 | 10/1959 | Prag ............................ 224/42.03 R |
| 3,082,033 | 3/1963 | Bosher . |
| 3,085,826 | 4/1963 | Carreau . |
| 3,295,643 | 1/1967 | Peterson et al. ..................... 190/125 |
| 3,726,422 | 4/1973 | Zelin . |
| 3,730,308 | 5/1973 | Pelavin ............................... 190/125 |
| 3,913,811 | 10/1975 | Spencer . |
| 3,923,219 | 12/1975 | Glover et al. ................ 224/42.44 X |
| 3,999,693 | 12/1976 | Cooper, Sr. . |
| 4,065,166 | 12/1977 | Shoemaker . |
| 4,125,214 | 11/1978 | Penn . |
| 4,223,939 | 9/1980 | Beggs . |
| 4,236,461 | 12/1980 | Barksdale ........................... 5/119 X |
| 4,241,858 | 12/1980 | Lawroski ..................... 224/42.03 A |
| 4,358,005 | 11/1982 | Fontana ............................. 190/18 A |
| 4,403,716 | 9/1983 | Carlson . |
| 4,671,439 | 6/1987 | Groeneweg ................. 224/42.03 A |

FOREIGN PATENT DOCUMENTS

| | | |
|---|---|---|
| 2945274 | 5/1981 | Fed. Rep. of Germany ... 224/42.03 R |
| 19507 | of 1905 | United Kingdom ................ 190/127 |

Primary Examiner—Henry J. Recla
Assistant Examiner—J. Casimer Jacyna
Attorney, Agent, or Firm—Laney, Dougherty, Hessin & Beavers

[57] ABSTRACT

A luggage carrier assembly mountable to the rear of a passenger van or the like, including a first rigid frame adapted to be positioned in a substantially vertical plane adjacent the rear side of a van to which the luggage carrier is mounted. A second rigid frame is connected to the first rigid frame and extends substantially normal to one side of the first rigid frame along the lower edge thereof. The two interconnected frames are movable together. Clamping brackets are provided for pivotally supporting the interconnected first and second frames on the rear of the van for pivotation about a horizontal axis extending parallel to the ground and transversely across the van. Luggage enclosing panels are connected to, and define with the two frames, a compartment for containing luggage. At least one supporting leg is pivotally secured to the upper side of said first rigid frame and is pivotable between a first, horizontally extending position adjacent the first frame and parallel to the ground, to a second, vertically extending ground engaging and frame supporting position.

38 Claims, 3 Drawing Sheets

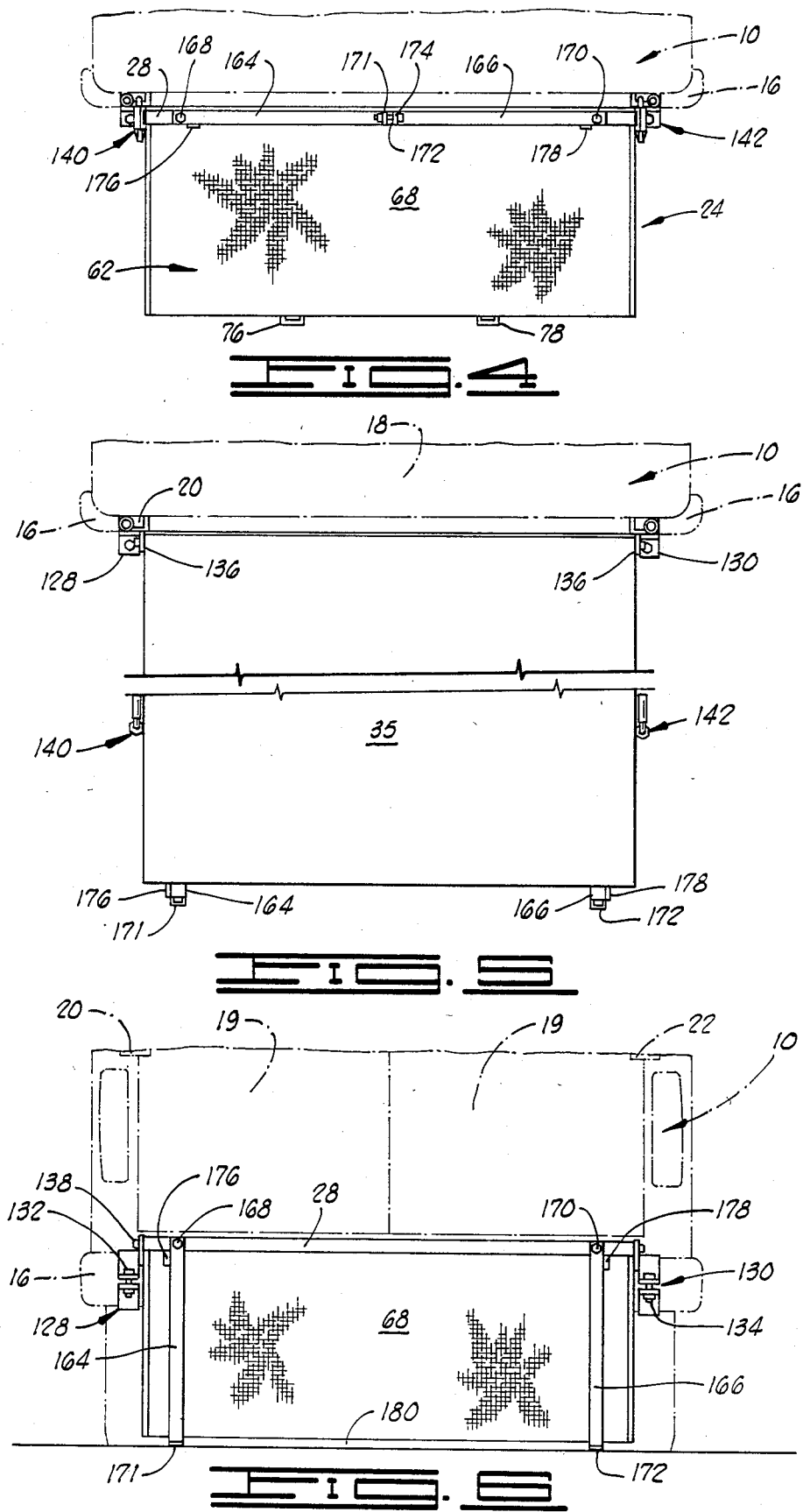

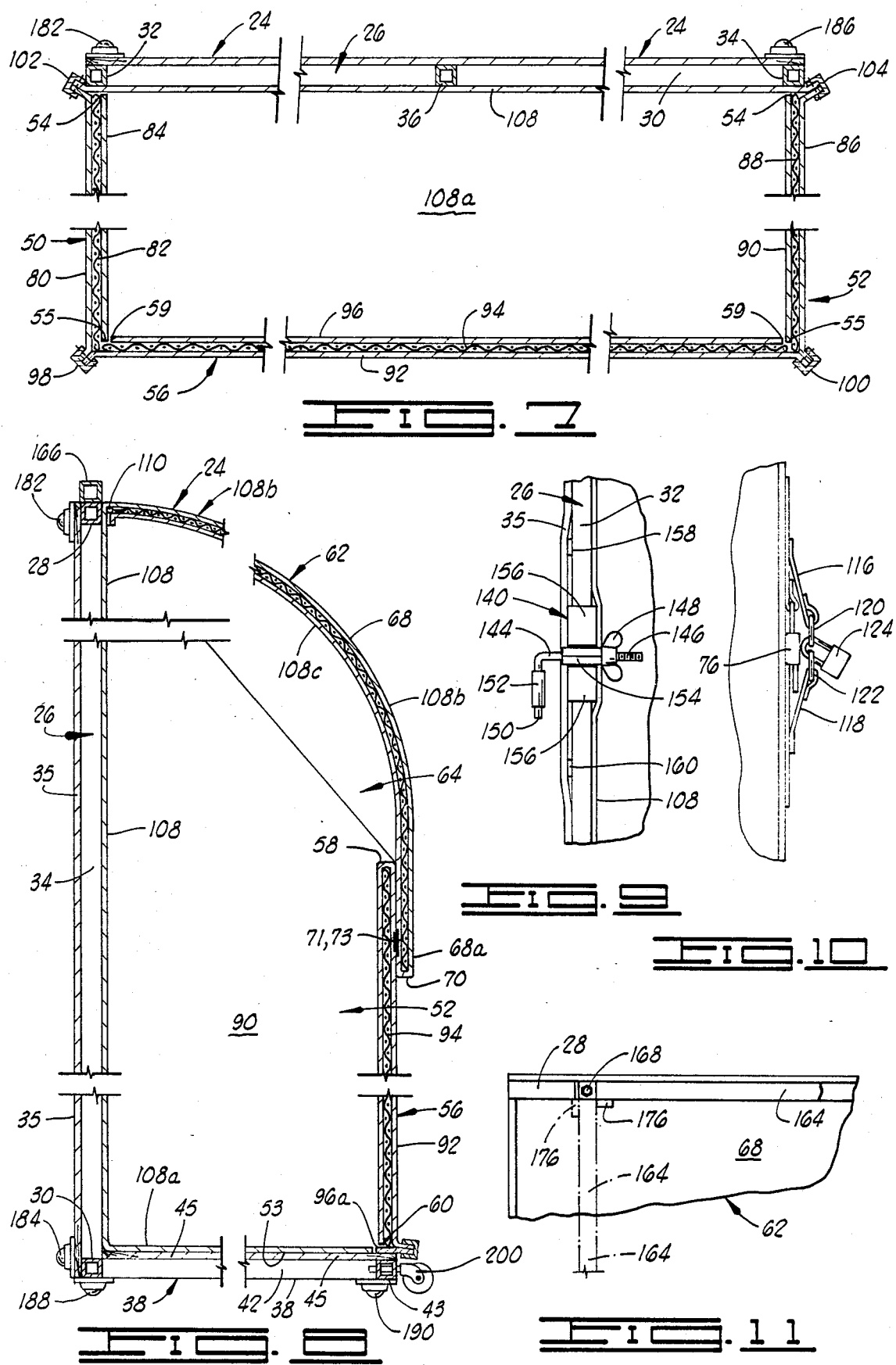

VEHICLE MOUNTABLE LUGGAGE CARRIER ASSEMBLY

FIELD OF THE INVENTION

This invention relates to luggage carrying compartments and enclosures which can be detachably secured to a side of a van-type automotive vehicle or the like, and more particularly, though not by way of limitation, to a luggage compartment which can be easily and quickly secured to, or removed from, the vertically extending rear side of a van, using the door hinges and bumper at that location as points of securement.

BRIEF DESCRIPTION OF THE PRIOR ART

Many proposals have been previously made, and many devices have been manufactured and sold, which have as their objective, augmenting the luggage carrying capacity of motor vehicles by attaching racks, luggage bins or similar structures to the vehicle to accommodate luggage carried externally of the vehicle.

One type of structure used for increasing the total capacity of a motor vehicle is a tent-like sheath extension enclosure which is demountably secured to the rear side of a motor vehicle, and which is illustrated and described in Shoemaker U.S. Pat. No. 4,065,166. This tent-like sheath is made to extend at floor level from the rear side of a vehicle of a type having loading doors at the rear thereof, such as vans or the like. The enclosure is retained on the vehicle by brackets secured to the lower frame of the loading door, and by hangers affixed to the laterally opening door panels which normally close the doorway of the vehicle.

This demountable enclosure, once mounted upon the vehicle, cannot be pivoted between its initially mounted status and a second position, and remains in an upright rearwardly extending position at all times. Neither is the enclosure which is illustrated in this patent susceptible to being rested upon the ground and pushed across the ground while the contents of the enclosure remain therewithin.

A portable luggage carrier mountable on the rear side of compact cars is described and illustrated in Cooper U.S. Pat. No. 3,999,693. Such vehicle-mountable luggage carrier includes a housing which is shaped to provide a forwardly facing wall complementary to the rear wall of the automobile upon which it is to be mounted. The devices which are used for attaching it to the vehicle include bumper-engaging means which enables it to be secured to the rear bumper of the vehicle, and a knee brace which retains it in a horizontally-extending position. The rear wall of the luggage carrier is provided with a license plate recess light and with tail lights so that the requirements concerning vehicle lighting can be satisfied when the luggage carrier is in use. The luggage carrier of the Cooper system is intended to be mounted in only one position on the rear of the compact vehicle to which it is secured, and it cannot be rolled or otherwise moved across a supporting surface, such as a concrete driveway, an asphalt parking lot or the like when it is demounted from the vehicle.

Spencer U.S. Pat. No. 3,913,811 discloses a utility carrier which includes a horizontally-extending supporting platform or framework which is pivotally connected to another framework which extends vertically. Diagonal braces interconnect the vertically extending framework with the horizontally extending framework, and a plurality of clamps are provided for the purpose of attaching the utility carrier to a horizontally-extending structure which is analogous to a vehicle bumper. In one embodiment of the invention, it is possible to pivot the horizontally extending framework or platform upwardly to a position such that the utility carrier occupies relatively little space at the rear of the vehicle upon which it is mounted.

Reilly U.S. Pat. No. 2,848,271 discloses a tailboard cover for use on open-ended vehicles, such as station wagons. The tailboard referred to is that gate or portion of the station wagon or other vehicle which folds to an up position and in doing so, closes a large portion of the rear wall opening of the vehicle. When pivoted to the down position, it provides a horizontal platform beyond and to the rear of that opening. The tailboard cover contemplated by the Reilly disclosure is a series of frame-forming rods which are covered by canvas panels, and which define an enclosure extending over the horizontally-extending tailboard. The entire rear wall opening into the vehicle is thus closed by the protective cover at a time when the tailboard is in the down position, and the volume of the cover is such as to permit luggage and other articles to be disposed within the enclosure while resting upon the horizontally-extending tailboard.

Bosher U.S. Pat. No. 3,802,033 discloses a utility trunk compartment for a passenger automobile vehicle. The utility trunk compartment is adapted to fit within the trunk of the vehicle, and is adapted to carry cargo of unrestricted height. The compartment is a canopy-type enclosure. The function of the utility trunk compartment is to substantially augment the cargo-carrying capacity of the trunk, and to provide a weather-tight covering over the enlarged space within the utility trunk.

Widman U.S. Pat. No. 2,069,345 discloses a trunk compartment provided at the rear of the automobile. A flexible canvas element is used to provide an enclosure between the regular body of the automobile at which the opening to the trunk is defined, and the trunk lid when it is pivoted to the open position. The nature of the structure is such that it may either be made removable from the trunk space, or made a permanent part of the vehicle.

A folding luggage carrier which can be pivotally supported on the rear portion of an automobile, and folded to an operative transport position, or folded downwardly to a horizontally-extending position, is shown in Kirkpatrick et al U.S. Pat. No. 1,280,761. No provision is made for transporting this compartment by rolling it across a supporting surface after the compartment has been demounted from the vehicle.

None of the described structures shown in the cited prior art patents afford the versatility and flexibility in use which would be optimum. Moreover, none are specially adapted, in any of the embodiments illustrated or described in the cited patents, to utilization on modern passenger vans which generally, if not universally, include a pair of doors located at the rear side of the van and extending substantially the entire distance from the bumper to the roof of the van. Such doors are usually hung on hinges located at opposite sides of the van. Vans of this type are frequently used for transporting a number of passengers for various business or social occasions, and it is difficult to utilize the van efficiently when the luggage of all of the passengers must be stored inside the van with the passengers. Yet, none of the types of structures illustrated in the described patents is especially useful, if useful at all, on vans of the type described, or other upon vehicles which have a very tall or high rear wall expanse from bumper to roof, and which require a capability or being quickly loaded and unloaded with the luggage of a number of passengers.

GENERAL DESCRIPTION OF THE PRESENT INVENTION

The present invention is a highly versatile, relatively inexpensive and easily used luggage carrier assembly in which luggage or other articles can be carried on the outer side of a van-type vehicle with the assembly being quickly mountable and demountable on the rear of the vehicle, and useful in one position, for extending the floor area of the van and mounted in a relatively compact, minimal wind resistant position in another transport position.

Broadly described, the luggage carrier assembly of the invention comprises a first relatively large frame which is preferably of rectangular configuration and which is adapted to be pivotally supported adjacent the rear wall of a van or similar vehicle so that it can be pivoted from a vertically extending position in which it occupys a substantially vertical plane, into a lower, substantially horizontally extending postion in which it projects from the van in a substantially horizontal plane. Secured along the lower edge of the first frame, and extending substantially normal to one side thereof, is a relatively smaller second rigid frame which defines an L-shaped configuration with the first frame and projects in a horizontal plane extending rearwardly from a van to which the luggage carrier assembly is pivotally mounted. A plurality of panels are then connected to the first and second frames so as to define an enclosure in which luggage, or other articles, may be deposited for carriage or transport when the van is driven over the highway. The panels used may be rigid, semi-rigid or quite flexible in various embodiments of the invention, but generally will include a top or upper closure panel which is movable relative to relatively stationary lower panels so that by lifting the upper closure panel(s), access may be had to the interior of the carrier for placement of luggage therein, or for removal of luggage therefrom.

At the location where the first rigid frame joins the relatively smaller second rigid frame, means is provided for pivotally mounting the interconnected frames to the bumper of a vehicle upon which the carrier assembly is to be mounted for transport. The carrier assembly can pivot on this bumper mounting means so that the relatively large first rigid frame can pivot from a vertically extending position downwardly into a substantially horizontally extending position. Concurrently, the second rigid frame pivots from a horizontally extending position downwardly into a substantially vertically extending position in which it extends from the point of pivotal attachment to the bumper to a location relatively close to the ground but spaced upwardly therefrom sufficiently to clear the ground as the entire luggage carrier assembly is pivoted through 90°. Clamping elements are carried on the first frame at opposite sides thereof in horizontally spaced relation to each other, and these clamping elements are utilized for clamping the center portion of the relatively large rigid first frame to the rear door hinges conventionally provided on van-type vehicles.

In those instances where less preferred embodiments are utilized on other types of vehicles, other securing means can be provided for detachably clamping the first rigid frame to a side wall or rear wall of the vehicle for transport and carriage purposes.

In a preferred embodiment of the invention, one or more supporting legs are pivotally secured to the upper side of the first rigid frame so that each of these legs can be pivoted between a folded, transport position in which it is folded into a stored position in coplanar alignment with the first rigid frame, to a second position, in which the support legs extend vertically downwardly and support the first rigid frame in a horizontally extending position. In this position, it can be used, with paneling secured to one side of the first rigid frame, as an extension of the van flooring. In such position and status, the first frame and associated paneling can be used either as table or as an additional extended sleeping surface if desired. In this status, the luggage carrier assembly is supported at one side by the clamps utilized to pivotally secure the interconnected first and second rigid frames to the bumper of the vehicle, while at the opposite side, the assembly is supported by the one or more legs pivotally secured to the upper edge of the first frame, and, which at such time are pivoted into a vertically extending position in which the lower ends of these legs engage the ground and support the assembly.

Finally, in another preferred embodiment of the invention, spherical roller members are secured at several exposed locations on the first rigid frame, and there are also several rollers secured at spaced locations on the exposed outer side of the second rigid frame. These rollers function to permit the luggage carrier assembly to be rolled across the ground or pavement when the assembly is detached from the vehicle upon which it has been mounted for transport. The luggage contained therein can thus be rolled with the assembly into a motel, garage or other location without the necessity of lifting the luggage out of the compartment defined by the panels which interconnect the two frames. It will be perceived from this description that the orientation or attitude of the luggage carrier assembly at the time it is rolled across a surface in the manner described can be either a vertically extending orientation, where the rollers supporting the weight of the assembly are carried on the second rigid frame, or, alternatively, can be a relatively horizontally extending orientation in which the rollers carried on the exposed side of the rigid first frame are used to support the entire load of the assembly.

An important object of the present invention is to provide a vehicle mountable luggage carrier assembly which can be quickly and easily mounted to a substantially vertically extending wall of a van-type automotive vehicle so that the luggage carrier assembly can be moved from one location to the other with the luggage enclosed therein as the van is driven from one location to another.

Another important object of the invention is to facilitate the transport of large amounts of luggage in a detachable or demountable luggage carrier assembly which can be secured to the rear side of a passenger van during the transport of the van without danger to the luggage, with weather protection afforded by the assembly, with minimal wind resistance offered by the luggage carrier assembly, and to thereby facilitate the provision of a much less cluttered interior for the van, and hence enhanced comfort for its passengers.

Another object of the invention is to provide a vehicle mountable luggage carrier assembly which can be mounted closely adjacent one of the side or rear walls of a recreational vehicle at the time when the luggage carrier assembly is used to contain and transport luggage, but which can then be folded down to a substantially horizontally extending position in which it projects outwardly from either a side wall or a rear wall of the vehicle on which it is mounted, and in such status forms a table or an extended sleeping surface.

Another and further object of the invention is to provide a luggage carrier assembly which can be loaded with luggage at the front door of a home or within a gound level garage, then rolled out to a van or similar type of vehicle having an extended top-to-bottom side wall or rear wall surface, then lifted upwardly and secured in a transport position adjacent such wall of the vehicle, and later demounted and easily rolled to a luggage discharge location after the vehicle has arrived at its destination.

Another object of the invention is to provide a luggage carrier assembly which can be easily mounted and demounted to the rear side of a passenger van-type automotive vehicle, and which affords excellent weather protection to large amounts of luggage which can be carried therein, and which itself is of relatively light weight, but which affords theft and vandal protection for the luggage by reason of the way the luggage carrier assembly is constructed.

Additional objects and advantages of the invention will become apparent as the following detailed description of the invention is read in conjunction with the accompanying drawings which illustrate certain preferred embodiments of the invention.

GENERAL DESCRIPTION OF THE DRAWINGS

FIG. 1 is a rear elevation view of the vehicle mountable luggage carrier assembly of the invention, showing the assembly predominately in elevation, but also illustrating certain parts broken away to show certain apsects of the construction of the assembly. The assembly is illustrated as it appears when mounted to the rear wall of a passenger van, with the van configuration illustrated by the use of broken or phantom lines.

In FIG. 2, as in FIG. 1, a portion of the van to which the luggage carrier assembly is mounted is illustrated in broken phantom lines.

FIG. 4 is a top plan view of the luggage carrier assembly depicted in FIG. 2.

FIG. 5 is a top plan view of the luggage carrier assembly after it has been pivoted downwardly to a generally horizontally extending status in which a relatively large first rigid framework and associated paneling projects in a substantially horizontal plane to the rear of the van. In this drawing figure, parts have been broken away for simplification of illustration, and the part of the van to which the luggage carrier assembly is detachably mounted is again shown in broken phantom lines.

FIG. 6 is a rear elevation view of the luggage carrier assembly in the folded down status shown in FIG. 5. FIG. 6 also depicts the vertically extending supporting legs in their load supporting, vertically extending positions.

Figures 2, 3:
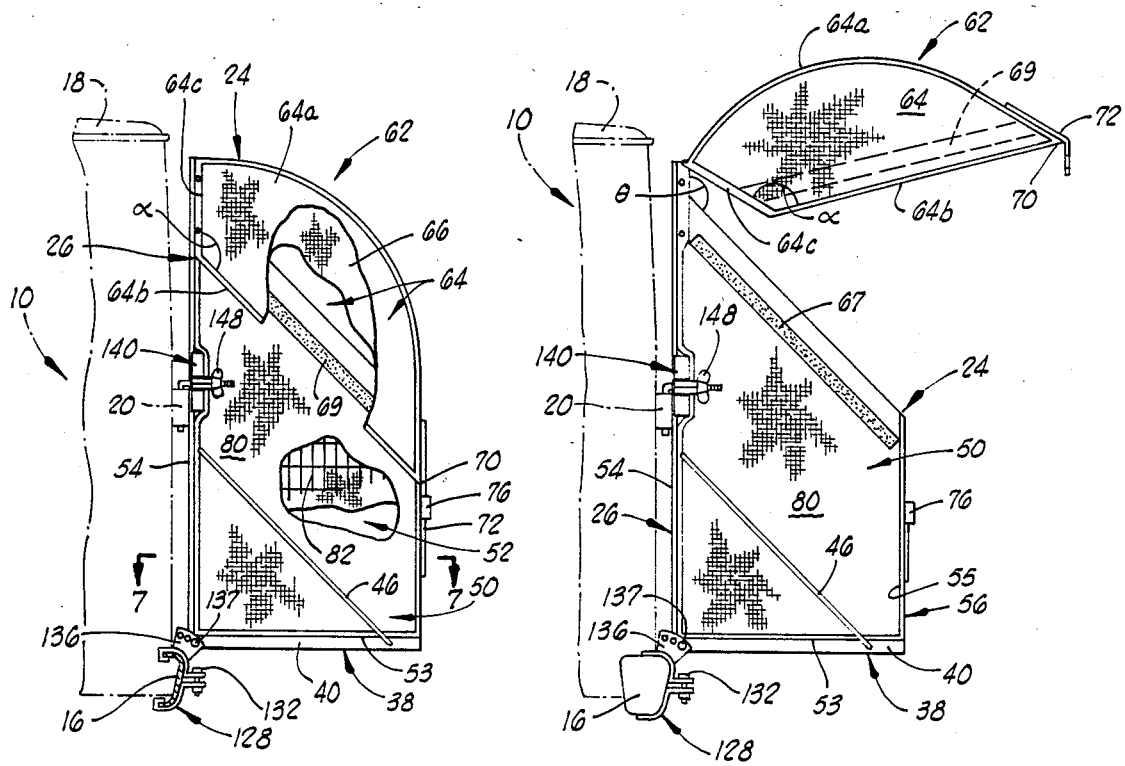
FIG. 2 is a side elevation view of one side of the vehicle mountable luggage carrier assembly of the invention with certain parts again broken away in order to illustrate certain details of construction of the luggage carrier assembly.
FIG. 3 is a view similar to FIG. 2, but illustrating the appearance of the luggage carrier assembly as a top closure panel or cover subassembly is being pivoted upwardly to provide access to the interior of the luggage carrier assembly.

FIG. 7 is a horizontal sectional view taken along line 7—7 of FIG. 2.

FIG. 8 is a vertical sectional view taken along a centrally disposed vertical plane extending through a modified embodiment of the invention, with such plane extending parallel to the front-to-rear longitudinal axis of the van.

FIG. 9 is a view in elevation of the attaching hook elements used for detachably connecting the relatively large rigid first frame, forming a part of the luggage carrier assembly, to hinges which are provided at substantially standard or conventional locations on most passenger vans.

FIG. 10 is a view in elevation of a structural detail which shows a security lock used in one embodiment of the invention.

FIG. 11 is a detailed view illustrating certain parts of the structure in elevation.

DETAILED DESCRIPTION OF PREFERRED EMBODIMENTS OF THE INVENTION

Figure 1:
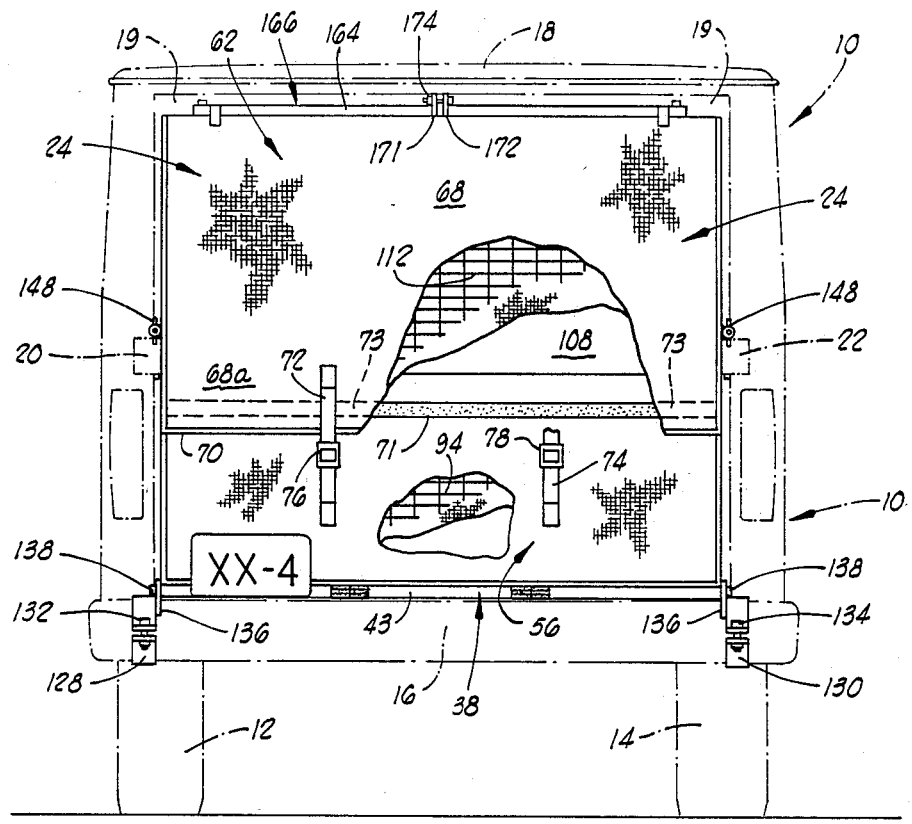

Referring initially to FIG. 1, a passenger van automotive vehicle is outlined in phantom lines and is designated generally by reference numeral 10. The van 10 includes a pair of ground engaging wheels 12 and 14, a rear bumber 16 and a roof 18. As is conventional in van-type vehicle construction, the van further includes rear doors 19 which are hinged by a pair of exposed hinges 20 and 22 at the locations illustrated in FIG. 1. It will be perceived that the hinges 20 and 22 are located adjacent opposite sides of the van and are approximately halfway from the bumber 16 to the roof 18. The location of the hinges 20 and 22 may vary slightly on different types of vans, but generally, and for most vans, will be very close to the positions shown in FIG. 1.

The vehicle mountable luggage carrier assembly of the invention is designated generally by reference numeral 24, and is shown detachably mounted to the rear wall of a van-type vehicle 10. The luggage carrier assembly 24 can be detachably mounted on other types of vehicles, but it is with respect to a van-type vehicle having a relatively large vertical expanse of side or rear wall that the present invention finds its most useful application.

The luggage carrier assembly 24 comprises a frame means best illustrated in FIGS. 2, 3 and 8. The frame means broadly describes and alludes to a relatively large, rigid first frame or framework 26 and a relatively smaller, rigid second frame 38. The relatively large rigid frame 26 is best illustrated in FIGS. 7 and 8. It extends in a vertical plane disposed substantially parallel to the vertically extending rear wall of the vehicle, and is placed slightly to the rear of the rear wall of the vehicle.

The first rigid frame 26 of the luggage carrier assembly is substantially rectangular in configuration and, in the illustrated embodiment of the invention, is formed of a plurality of interconnected, square cross-sectioned tubular members. Thus, parallel top and bottom substantially horizontally extending tubular members 28 and 30, respectively, are interconnected at their opposite ends by a pair of parallel, vertically extending side tubular members 32 and 34. The square cross-sectioned tubular frame elements 28, 30, 32 and 34 can be interconnected by welding, or the frame elements can be connected by suitable fasteners. For enhancing the mechanical strength and providing support at an important location, the first rigid frame 26 also includes a centrally located, vertically extending square cross-sectioned frame element 36 which is secured at its lower end to the lower, horizontally extending frame element 30, and at its upper end to the upper horizontally extending frame element 28.

A second, relatively smaller rigid frame is secured to the lower edge of the first rigid frame 26, and is designated generally by reference numeral 38. The second rigid frame element 38 is best illustrated in FIGS. 1, 2 and 8 of the drawings. The second rigid frame 38 is generally rectangular in configuration and includes a plurality of interconnected, rigid tubular elements of rectangular cross section. Thus, the frame 38 includes a pair of rigid tubular side frame elements 40 and 42 which extend parallel to each other. These side frame elements are interconnected by a pair of parallel, transverse rigid tubular frame elements, one of which is the common frame element 30 also forming a part of the relatively large first rigid frame 26. The other of the two parallel transverse rigid tubular frame elements is the frame element 43 depicted in FIG. 8.

As shown in FIG. 8, the second relatively smaller rigid second frame element 38 projects at a right angle to the rigid frame 26 and extends, in the illustrated position, in a horizontal plane and projects rearwardly from the rear wall of the van as shown in FIGS. 2 and 3. The relatively smaller rigid frame 38 functions, conjunctively with paneling 45 forming the upper side thereof (see FIG. 8) and hereinafter described, as a supporting structure upon which luggage or other articles placed within the luggage carrier assembly can be supported and rested during transport of the luggage. To provide further mechanical strength to the interconnected first and second rigid frames 26 and 38, a pair of diagonal braces 46 and 48 project downwardly, and each of these braces is interconnected at its opposite ends to the side frame elements of the first rigid frame 26, and to the second rigid frame 38, respectively.

For the purpose of providing an enclosure into which luggage or other articles can be placed for storage and transport, a series of panels are provided and are interconnected to define, in cooperation with the first and second rigid frames 26 and 38, a substantially rectangularly cross-sectioned enclosure. As has been explained previously, the first rigid frame 26 has a rigid panel element 35 of plywood or the like which extends across the outer or forward side of the frame (or, stated differently, adjacent to the back wall of the van). The relatively smaller second rigid frame 38 has the similar rigid panel 45 secured across the top or inner side thereof to provide a rigid support for luggage carried within the luggage carrying assembly. In addition to the panels 35 and 45, a pair of generally trapezoidally shaped side panels, designated generally by reference numerals 50 and 52, are provided and are located in horizontally spaced, parallel planes disposed at opposite sides of the luggage carrying assembly. As best illustrated in FIGS. 2 and 3, each of the panels 50 and 52 includes a horizontally extending bottom edge 53 at which the respective panel, 50 or 52, is secured in any suitable way to the lateral edge of the relatively small second rigid frame 38.

The forward vertical edges 54 of the side panels 50 and 52 are secured to the relatively large first rigid frame 26 as shown in FIG. 7. The horizontally spaced side panels 50 and 52 are interconnected at their vertically extending, parallel rear edges 55 by a transversely extending, substantially rectangular rear panel 56. The rear panel 56 extends in a vertical plane which is substantially parallel to the plane occupied by the first rigid frame 26, and also to a plane occupied by the rear wall of the van. The rear panel 56 extends vertically upwardly from the second rigid frame 38 for a distance which is about one-half the height of the relatively large first rigid frame 26, and terminates in a horizontally and transversely extending top edge 58 as shown in FIG. 8. The horizontally extending bottom edge 60 of the rear panel 56 rests upon the relatively small second rigid frame 38 as shown in FIG. 8. The opposite side edges 59 of the rear panel 56 are interconnected to vertically extending edges 55 of the side panels 50 and 52 (as illustrated in FIG. 7) in a manner hereinafter described in greater detail.

In order to permit the luggage containing space to be closed and made weathertight, a large, pivotally mounted closure subassembly 62 is pivotally connected to the upper side of the first rigid frame 26 so that it can pivot from a closed position, as illustrated in FIG. 2, to an open position as illustrated in FIG. 3. The closure subassembly 62 includes a pair of parallel, horizontally spaced closure side panels 64 which are characterized in having an arcuate upper edge 64a, a diagonal edge 64b and a vertical edge 64c. The diagonal edge 64b and vertical edge 64c of the closure side panels define an obtuse angle which is substantially equivalent to the angle formed between the upper side edges of the panels 50 and 52 and the rigid frame 26 where these side edges intersect the plane of this first rigid frame. The purpose of this configuration of the closure side panels 64 is to permit the closure subassembly 62 to be pivoted down to the position illustrated in FIG. 2, in which position the lower edges 64b of the closure side panels 64 will extend along and overlap the upper edges of the side panels 50 and 52, heretofore described, and the forward upper edges 64c will be in contact with with and sealingly engage, the first rigid frame 26.

On the outer sides of each of the panels 50 and 52 along the top, diagonal edges thereof, a diagonal strip 67 of Velcro materials is secured. Each Velcro strip has its adherent side facing outwardly for cooperating contact and fastening engagement with a similar Velcro strip 69 secured on the inner side of each of the closure side panels 64.

In addition to the closure side panels 64, the closure subassembly 62 is also provided with an arcuate upper panel 68 which interconnects the closure side panels 64 as illustrated in FIGS. 1, 6 and 8. As will be noted in referring to FIG. 8, the upper panel 68 of the closure subassembly 62 is curved so as to subtend an angle of about 90°, and further includes a skirt or overlap portion 68a. This skirt or overlap portion 68a extends down across, and overlaps the upper portion of the rear panel 56 as best shown in FIGS. 1 and 8. The arcuate upper panel 68 includes a horizontally and transversely extending lower edge 70 which defines the lower extremity of the portion 68a. Cooperating Velcro strips 71 and 73 secured to the respective panels 56 and 68 as shown in FIG. 8 function to fasten the closure subassembly in the closed position.

Secured to the outer side of the arcuate upper panel 68 just above the lower edge 70 thereof, and horizontally spaced from each other along the transverse width of the arcuate upper panel, are a pair of flexible securement straps 72 and 74. The securement straps 72 and 74 are used to further secure the closure subassembly 62 in its closed position by extending the securement straps through a pair of latching buckles 76 and 78 which are secured to the rear side of the rear panel 54 as illustrated in FIGS. 1, 2 and 4.

The specific construction of the several panels which, in a preferred embodiment of the invention, are used in conjunction with the first and second rigid frames 26 and 38 for forming the luggage compartment and enclosure, is best illustrated in FIGS. 1, 7 and 8 of the drawings. Referring to the side panel 50, which has a construction typical of the several other panels 52, 56 and 68, the side panel 50 includes a flexible external fabric cover 80, heavy gauge wire mesh semi-rigid core element 82 and a flexible fabric inner liner 84. Counterparts of these structural components can be found in each of the panels 52, 56 and 58. Thus, the opposite side panel 52 includes a flexible external fabric cover 86; a semi-rigid wire mesh core element 88 and a flexible fabric inner liner 90. The transverse rear panel 56 includes a flexible external fabric cover 92, a semi-rigid wire mesh core element 94 and a flexible fabric inner liner 96.

The external, flexible waterproof fabric cover elements used on the several panels are interconnected so that there is a continuous unbroken covering around the interior of the assembly in which the luggage is located. Thus, it will be noted in referring to FIG. 7 that the external fabric covers 80, 86 and 92 are all sewn together at their intersecting edges, with the locations of such joinder of edges being denominated by reference numerals 98, 100, 102 and 104. It will also be noted in this figure that a forward panel 108 of the flexible waterproof fabric material is secured to the inner side of the first rigid frame 26 and has its vertically extending lateral edges also sewn to the covers 80 and 86 at the joinder locations 102 and 104, so that there is a complete and continuous peripheral enclosure of the space within the waterproof fabric material which makes up the several covers of the panels. In this regard, it will also be noted in referring to FIG. 8 that the flexible waterproof fabric cover 108 which lines and is secured against the inner side of the first rigid frame 26 is turned through 90° at its lower edge, and has a horizontal expanse 108a which lies across the top of, and covers, the rigid support panel 45 secured to the upper side of the second rigid frame 38. The upper portion of the cover 108 is extended, and becomes continuous and unitary with a flexible, external fabric waterproof cover element forming a part of the closure subassembly 62, as hereinafter described.

The closure subassembly 62 includes an elongated extension of the flexible waterproof fabric cover 108, which extension forms the external fabric cover of the closure subassembly, and is denominated by reference numeral 108b. It will be noted in referring to FIG. 8, that the panel 108 is extended even further than the external waterproof fabric cover 108b, in that it is turned back into and against the inside of the arcuate upper panel 68 of the closure subassembly 62. Thus, an internal section 108c thereof extends over the entire inner side of the arcuate upper panel, and terminates adjacent the hinges 110 by which the closure subassembly 62 is secured to the horizontally extending tubular member 28 of the first rigid frame 26. Positioned between the internal flexible liner 108c and the external flexible waterproof fabric cover 108b is a semi-rigid wire mesh core element 112. The wire mesh core element 112 imparts shape and rigidity to the arcuate upper panel 68 of the closure subassembly 62.

The closure side panels 64 of the closure subassembly 62 are of a construction which differs from the side panels 50 and 52 and rear panel 56. Each of the closure side panels 64 and 66 is thus constituted by a single, flexible waterproof fabric sheet which is a lateral projection or continuation of the external flexible fabric of the waterproof cover element 108b located on the outer side of the arcuate top portion of the closure subassembly 62.

It will be noted in referring to FIG. 8 that the external fabric cover 92 is turned over at its upper edge and then extends downwardly, as the internal flexible fabric liner 96, inside of the semi-rigid wire mesh core element 94. The continuous fabric constituted by the external flexible fabric cover 92 and the inner flexible fabric liner 96 then terminates in a free lower edge inside the enclosure defined by the several panels, and this free lower edge can be seen in FIG. 8. The inner liner 96 thus constitutes a free flap which can be lifted up and extricated from the interior of the luggage carrier assembly if desired.

The side panels 50 and 52 are similarly constructed. The flexible fabric inner liners 84 and 90 are therefore extensions of the external fabric covers 80 and 86, respectively, where the latter covers have been turned over at the top edges of the side panels and extended downwardly to form the respective flexible fabric inner liners. The described integral or unitary construction of the several flexible fabric cover and liner elements which is characteristic of the side panels 50 and 52 and of the rear panels 56 permits the wire mesh core elements 82, 88 and 94 to be extricated from the interior of the luggage carrier assembly at a time when the free flaps constituted by the flexible fabric inner liners 84, 90 and 96 are lifted upwardly so as to free the top edges of the respective wire mesh core elements, and thus permit one or more of the wire mesh elements to be removed from the illustrated position between the flexible fabric external cover and the flexible fabric internal liner. The closure subassembly 62 must, of course, be raised at this time in order for this to be done.

In order to secure against theft, the luggage or other articles carried within the luggage carrying assembly 24, a pair of heavy, strong opposed straps 116 and 118 are secured to the arcuate upper panel 68 near its lower edge, and to the external fabric cover 92 of the rear panel 54, respectively. As shown in FIG. 10, the two straps 116 and 118 carry D-rings 120 and 122 at their ends most closely adjacent each other. The D-rings 120 and 122 permit a lock 124 to be utilized for locking the closure subassembly 62 in its closed position in which the overlapping portion 68a of the arcuate upper panel 68 is held in its abutting closure position with respect to the rear panel 56.

In addition to the security afforded by the strong heavy straps 116 and 118, the D-rings 120 and 122 and the lock 124, the luggage carried in the assembly is also secured against unauthorized removal by one who may seek to slash through the external flexible waterproof fabric cover disposed on the outer side of the several panels. Prevention of such unauthorized removal of the luggage by slashing this fabric material is prevented by the inclusion in the structure of the wire mesh core elements 82, 88, 94, and 112. Although an ordinary knife can cut through the canvas or other flexible external fabric covers forming a part of the several panels, it cannot cut through the heavy wire mesh core elements, and the mesh is sufficiently small (approximately one inch-by-one inch square openings) that the luggage cannot be removed from the luggage containing space through knife-formed openings so long as the wire mesh core elements are in the illustrated position.

The vehicle mountable luggage carrier assembly 24 is shown mounted to the vertically extending rear side of a van-type passenger vehicle 10. As is conventional construction on vans, the rear wall of the van extends in a near vertical plane, and carries a pair of doors which swing open about lateral, vertically extending edges, and meet for closure in the center of the rear wall of the van. This is typical construction, and is surprisingly uniform throughout all types of modern passenger vans. A slight variation exists among the various van types in the location of the hinges employed for pivotally supporting the pair of doors at the rear of the van, but even this aspect of the van construction is not subject to wide variation.

The luggage carrier assembly 24 of the invention is here illustrated as mounted to a passenger van 10 at the rear side thereof, since this constitutes a preferred mode of use of the luggage carrier assembly. It will be appreciated, however, and will be even better understood following the subsequent description, that the assembly 24 can be used on other types of vehicles in addition to vans, with some slight modification in some of the features of the invention.

With respect to the illustrated utilization of the luggage carrier assembly 24 on a passenger van 10, it it will be perceived, as has previously been pointed out, that the first rigid frame 26 projects in a near vertical plane in the luggage carrying transport status of the luggage carrier assembly 24. This position is illustrated in FIGS. 1, 2, 3 and 4 of the drawings. To mount the luggage carrier assembly 24 in this vertically extending transport status, the lower portion of the assembly, at a location where the first rigid frame 26 is fixedly secured to the second rigid frame 38, is pivotally connected to the bumper 16 of the van. This pivotal mounting is accomplished by means of a pair of clamping brackets 128 and 130. The clamping brackets 128 and 130 may be variously constructed, but in the illustrated form, include a pair of clamp jaws interconnected by bolts and nuts 132 and 134 which can be tightened to draw the clamping jaws toward each other, and thereby tighten them upon the bumper 16. The clamping brackets 128 and 130 may thus be securely mounted on the bumper 16, and are sufficiently strong and mechanically rugged to permit them to support a major portion of the weight of the luggage carrier assembly 24 and the luggage carried therein.

Forming a portion of each of the clamping brackets 128 and 130 is an apertured flange 136. These apertured flanges 136 carried on the two clamp brackets 128 and 130 are disposed on the inner side of the respective clamp brackets and face each other as shown in FIG. 1. Each of the flanges 136 carries a series of holes therethrough which facilitates some adjustment of the exact location of the pivotal axis about which the luggage carrier assembly will pivot after it has been mounted to the clamping brackets 128 and 130. In order to effect the pivotal mounting of the luggage carrier assembly 24 to the clamping brackets 128 and 130, a projecting stud or short stub shaft 137 is carried on the rear outer side of the pair of tubular side frame elements 40 and 42 which extend parallel to each other, and make up a portion of the second relatively smaller rigid frame 38.

In addition to the support afforded the luggage carrier assembly 24 by the pivotal securement of the lower portion of the carrier assembly to the clamping brackets 128 and 130 which are clamped to the bumper 16, the assembly 24 is also held in position by means of a pair of clamp bolt subassemblies 140 and 142. These clamp bolt subassemblies can be perceived in FIGS. 2, 3 and 4, and are perhaps best illustrated in FIG. 9. Referring to the latter figure of the drawings, each of the identically constructed clamp bolt subassemblies 140 and 142, includes an L-shaped clamp bolt which has a relatively long leg 144 carrying threads 146 over an end portion thereof, which threads are engaged by a wing nut 148. The relatively shorter outer leg 150 of the L-shaped clamp bolt carries a sleeve 152 made of a resilient material. The leg 144 of the L-shaped clamp bolt extends slidably through a rigid sleeve 154 which is welded, or otherwise suitably secured, to a tubular element 156 which is slidably mounted upon one of the vertically extending side tubular frame members, 32 or 34, of the first rigid frame 26. A limited amount of vertical reciprocating sliding movement of each tube 156 on the respective tubular side frame members 32 and 34 is afforded by the stand off spacing between these tubular frame members and the rigid plywood panel 35, as a result of the use of the spacers 158 and 160 (see FIG. 9), and the ability of the flexible fabric internal liner 108 to permit such sliding movement at this point (also portrayed in FIG. 9).

The manner in which the clamp bolt subassemblies 140 and 142 are utilized, in conjunction with the clamping brackets 128 and 130, for supporting the luggage assembly 24 in its transport position, is best illustrated in FIGS. 1, 2 and 9. It will be noted, in referring to these figures, that the clamp bolt subassemblies 140 and 142 are located generally in the vicinity of the hinges 20 and 22 by which the doors of the van which close the rear side of the van are pivotally supported on the van. There is generally a space which exists inside the hinge leaf, and during the mounting of the luggage carrier assembly 24 in the luggage storage transport position, the legs 150 of the L-shaped bolts in the clamp bolt subassemblies 140 and 142, along with the resilient sleeves 152 carried thereon, extend into the space inside the leaves of the hinges. This engagement is illustrated in FIGS. 2 and 3. To effect this engagement, the tube 156 is slid upwardly on the frame element 32 until the downwardly projecting leg 150 of the L-shaped bolt of the respective bolt subassembly is sufficiently elevated to permit its end to be lowered into the space behind the hinge leaf. At this time, the longer leg 144 of the L-shaped bolt has been moved inwardly toward the van a sufficient distance, by turning of the wing nut 148, such that the lower end of the leg 150 of the bolt is positioned over the space into which it is to project when the clamp bolt subassemblies are in their clamping status. With this alignment achieved, the respective tube 156 is then slid downwardly on the tubular side frame member 32 (or 34), until the leg 150 projects into the space behind the hinge 20. When the leg is in this position, the wing nut 148 is then tightened to draw the leg 150 rearwardly so that the resilient sleeve 152 bears against the hinge 20. The sleeve 152 or resilient material functions to prevent vibration and noise or chatter.

This type of engagement and clamping of the clamp bolt subassemblies 140 and 142 is carried out in the case of both of the clamp bolt subassemblies which are generally aligned with the two hinge elements 20 and 22 carried on the van 10. In most instances, where these hinge elements are located at slightly different locations on the rear of the van, the ability of the clamp bolt subassemblies 140 and 142 to be slid upwardly and downwardly on the tubular side frame elements 32 and 34, coupled with the ability to rotate the L-shaped bolts within the sleeve 154, permits any slight difference in the precise location of the hinges 20 and 22 to be accommodated. The clamp bolt subassemblies to be effectively employed for securing the central forward portion of the luggage carrier subassembly 24 to the rear side of many types of vans.

Thus, it will be perceived that by the use of the clamping brackets 128 and 130, which secure the lower portion of the luggage carrier assembly 24 to the bumper 16, and by the concurrent and cooperative use of the clamp bolt subassemblies 140 and 142 which secure the central portion of the luggage carrier assembly 24 to the hinges 20 and 22 carried at the rear side of the van, the entire luggage carrier assembly can be securely mounted adjacent the rear side of the van. At a time when the closure subassembly 62 is pivoted upwardly, as is illustrated in FIG. 3, luggage or other articles can be placed within the enclosure defined by the several panels 50, 52 and 56. The stored luggage or articles are, at this time, supported upon the rigid plate 45 which covers the upper side of the rigid second frame 38. After the luggage has been placed within the space defined between the side panels 50 and 52, the rear panel 56 and the rigid first frame 26, the closure subassembly 62 is pivoted downwardly to the closure position shown in FIG. 2, and is secured in this position. Securement is effected by engaging the described Velcro strips carried on the inside of the two, parallel closure side panels 64 with mating Velcro strips 69 at the upper edges of the outer sides of the side panels 50 and 52. It is also effected by engaging the flexible securement straps 72 and 74 with the latching buckles 76 and 78. If desired, the D-ring and lock subassembly shown in FIG. 10 can be employed for additional security. It will be noted that, because of the way the flexible external fabric cover is continuously formed, without breaks or gaps, the interior of the enclosure in which the luggage is located is essentially weatherproof, and is protected against blowing rain or water which might otherwise tend to seep or be driven into the interior of the structure.

After the van 10 has arrived at its destination, or in some instances, during intermittent recreation or overnight stops along the way, it may be desirable for several reasons to pivot the luggage carrier assembly 24 from the illustrated position, into a lowered, horizontally extending position. The lowered horizontally extending position of the luggage carrier assembly 24 is best illustrated in FIGS. 5, 6 and 11 of the drawings.

In order to pivot the luggage carrier assembly 24 from the position shown in FIGS. 1-4 into the horizontally extending position shown in FIGS. 5 and 6, the clamp bolt subassemblies are first released from their engagement with the hinges 20 and 22 of the van doors. This is accomplished by rotating the wing nuts 148 of the two clamp bolt subassemblies until the L-shaped clamp bolts have been released and engage the hinges 20 and 22 only loosely. At this time, the tubes 156 can be slid upwardly on the tubular frame members 32 and 34 on which they are mounted until the legs 150 of the L-shaped bolts clear the respective hinges 20 and 22 (see FIG. 9). At this time the entire luggage carrier assembly 24 can be carefully and slowly pivoted downwardly, with pivotation occuring about the studs 138 which engage the flanges 136 carried on the respective clamping brackets 128 and 130.

As the assembly 24 pivots downwardly, the horizontally extending relatively smaller rigid second frame 38 will pivot downwardly from the horizontal position shown in FIG. 2, toward a generally vertically extending position in which it essentially bears against or is in close proximity to the rear surface of the bumper 16. Concurrently, the vertically extending rectangular rigid first frame 26 will commence to pivot downwardly from its vertical transport attitude, as shown in FIGS. 2 and 3, toward a horizontally extending position as illustrated in FIGS. 5 and 6.

Before downward pivotation of the luggage carrier assembly is commenced, it will usually be desirable to pivot a pair of supporting legs 164 and 166, illustrated in FIGS. 1, 4 and 11, from a stored, transport position as shown in these figures, to a luggage carrier assembly supporting position, as shown in FIGS. 5 and 6, and in dashed lines in FIG. 11. Each of the supporting legs 164 and 166 is an elongated member which has one of its ends pivotally connected to the upper surface of the top horizontal tubular frame member 28 forming a part of the first rigid frame 26. This relationship is illustrated in FIGS. 2, 4 and 11 where the pivot pins used to secure the legs 164 and 166 to the horizontally extending tubular top frame member 28 are demoninated by reference numerals 168 and 170, respectively.

At the opposite end of each supporting leg 164 and 166 from that end which is secured by the respective pivot pin 168 and 170 to the top horizontal extending tubular member 28, each of the supporting legs 164 and 166 carries a foot flange. These respective foot flanges project normal to the principal axis of each of the legs and are denominated by the respective reference numerals 171 and 172. Each of the foot flanges 171 and 172 is apertured so as to permit a latching bolt 174 to be extended through the aligned apertures when the legs are folded into the horizontally extending aligned positions shown in FIG. 4 of the drawings. The latching bolt 174 thus functions to retain the supporting legs 164 and 166 folded into their horizontal extending, aligned stored positions so that they will not interfere in any way with the utilization of the luggage carrier assembly 24, including its loading or unloading, at a time when the luggage carrier assembly is in its upright transport position.

When the luggage carrier assembly 24 is to be pivoted downwardly to its horizontally extending position, the latching bolt 174 is removed from the aligned apertures through the foot flanges 171 and 172. At this time, the supporting legs 164 and 166 can be pivoted about the pivot pins 168 and 170 to move them downwardly into the positions illustrated in FIG. 6. This supporting position is reached after the supporting legs 164 and 166 have been pivoted through an angle of 90°. This movement of the supporting legs brings the foot flanges 171 and 172 into flat abutting contact with the ground as shown in FIG. 6. It should also be noted that each of the supporting legs 164 and 166 carries one of a pair of stop tabs 176 and 178, which tab projects forwardly from the respective supporting leg. These stop tabs 176 and 178 are thus positioned to contact one side of the top horizontally extending tubular frame member 28 when the legs are pivoted downwardly to the position shown in FIG. 6, and thus to prevent further pivotation of the legs beyond the position shown in that figure.

It will be noted that the supporting legs 164 and 166 are of sufficient length that the foot plates or flanges 171 and 172 contact the ground at a location such that the rear panel 56 of the several panels forming the luggage enclosure remains clear of the ground, as indicated by the clearance space 180 which is depicted in FIG. 6 of the drawings. With the luggage carrier assembly 24 pivoted to the horizontally extending status shown in FIGS. 5 and 6, it is supported in this position by the supporting legs 164 and 166, and by the clamping brackets 128 and 130 which continue to securely engage the bumper 16 of the van 10.

The horizontally extending, lowered position of the luggage carrier assembly 26 depicted in FIGS. 5 and 6 has several advantages, and affords versatility to the structure of the invention in several ways. When the horizontal attitude is assumed by the assembly 24, the doors of the van, as depicted in FIG. 6, are cleared for opening and access can be had to the interior of the van from the rear thereof. Further, if an extended surface is desirable which constitutes, or is the equivalent of, a projection or enlargement of the floor of the van, this is developed by the rigid plywood panel 35 which is secured to the forward side of the first relatively large rigid frame 26. This plywood panel 35 is well supported at one side by the supporting legs 164 and 166, and at the other by the clamping brackets 128 and 130 when it extends substantially horizontally in coplanar alignment with the horizontal plane in which the floor of the van is located. Thus, if it is desired to have an extended or additional space for sleeping, or for extending a cot or sleeping bag, this is accomplished by pivoting the luggage carrier assembly 26 into the lower horizontally extending position. The upper surface of the luggage carrier assembly 24 which is now constituted by the upper surface of the rigid plywood panel 35 can now also be utilized as an eating surface at a campsite, if desired.

Finally, in the event that it may be desired to completely detach the luggage carrier assembly 24 from the van 10, this is easily accomplished after the assembly has been lowered to the horizontal position by simply loosening the clamping brackets 128 and 130 and sliding them laterally until the flanges 136 become disengaged from the stub shafts or studs 138. At this time, the forward side of the luggage carrier assembly 26 is released from engagement with the bumper and can be slowly and carefully lowered to the ground so that only the supporting legs 164 and 166 support one side of the assembly. The van can then be driven forward to clear the assembly 24 and to permit it to be set upright where it rests upon the second rigid frame 38. The luggage can then be removed from the interior of the luggage carrier assembly after pivoting the closure subassembly 62 upwardly to the open position. Alternatively, the luggage carrier assembly 26 can be easily rolled to the interior of a garage or to a location adjacent the door of, or inside of, a motel in order to permit the luggage to be removed from the carrier assembly at that location.

The structure which allows the luggage carrier subassembly 26 to be easily moved from one location to the other is best illustrated in FIGS. 7 and 8 of the drawings. As shown in these figures, the plywood panel 85 which is secured across the forward side of the first rigid frame 26 has four caster or spherical roller elements 182, 184 and 186 (the fourth roller element is not visible in the drawings), secured thereto at locations which are at the four corners of the frame and aligned with the top and bottom horizontally extending tubular members 28 and 30. Using these four roller elements as points of support, the luggage carrier assembly 24 can be lowered to a position where the first rigid frame 26 is closely adjacent the ground, and the entire luggage carrier assembly is supported on the rollers 182, 184 and 186 (and the fourth, unillustrated roller at the other corner of this substantially rectangular frame). These rollers are substantially omni-directional in their ability to turn or roll, so that the entire luggage carrier assembly 24 can be easily pushed along a concrete walk or asphalt driveway to whatever location it may be desirable to move the luggage after the carrier assembly has been demounted from the van.

Demounting of the entire assembly 24 from the van 10 is accomplished in the manner previously described, except that in addition to releasing the clamp bolt subassemblies 140 and 142 from their engagement with the door hinges 20 and 22 carried on the van, the clamping brackets 128 and 130 are also loosened by loosening the nuts on the nut and bolt assemblies 132 and 134. These clamping brackets 128 and 130 can then be removed from the rear bumper 16 of the van. Alternatively, the stub shafts or studs 138 which project through the apertures in the flanges 136 carried on the clamping brackets 128 and 130 can, in alternate constructions, be retracted to cause these elements to move back through the apertures in the flanges, thereby releasing the luggage carrier assembly 24 from further engagement with the clamping brackets. With this release, the luggage carrier assembly 24 is completely demounted from the van, and it can then be rolled on the rollers supported on the outer side of the first rigid panel 26, as has been hereinbefore described.

As an alternative to movement of the luggage carrier assembly 24 across a horizontal supporting surface by resting it upon the rollers 182, 184 and 186 and a fourth, unseen roller, the assembly 24 may instead be rested upon four rollers which are disposed at the four corners of the rectangular second rigid frame 38. Two of these rollers, 188 and 190, are illustrated in FIG. 8 of the drawings, and it will be perceived that the rollers are aligned with the tubular transverse frame element 43 and the bottom horizontally extending tubular element 30. It will be further perceived that an advantage of resting the luggage carrier assembly 24 upon the rollers secured to the lower side of the rigid frame 38 is that in this way the closure subassembly 62 is retained at the upper side of the luggage carrier assembly, and this permits the luggage to be easily accessed by pivoting this closure subassembly upwardly. Moreover, the luggage remains stacked and supported on the rigid frame 38 in substantially the same way that it was originally stored preparatory to transport with the assembly 24 attached to the rear side of the van.

Finally, suitable casters 200 can be provided at the lower rear corners at the positions illustrated in FIG. 8 so that the luggage carriage assembly can be rolled along on these casters after it is detached from the van, and tilted rearwardly from its vertically extending position.

From the foregoing description of the vehicle-mountable luggage carrier assembly of the invention, it will be perceived that a luggage carriage instrumentality has been provided which is highly versatile in its adaptability to various functions and utilizations, but which affords a safe, relatively easily used mode for transporting substantial amounts of luggage which would otherwise have to be carried internally of the vehicle, and would thus significantly reduce the space available for utilization by passengers in the van.

Although certain preferred embodiments of the invention have been herein described in order to afford a clear understanding of the principles upon which the invention is based, it will be understood that the illustrated preferred embodiments can be modified by structurally altering certain subassemblies and certain relative arrangements of structure, yet retaining, in doing so, the essential and fundamental principles upon which the invention is based. For example, the panels 50, 52, 56, 64 and 68 could be made of a rigid material, such as plastic, in a different embodiment of the invention. Changes and innovations of this type are therefore deemed to be circumscribed by the spirit and scope of the invention except as the same may be necessarily limited by the appended claims, or reasonable equivalents thereof.

What is claimed is:

1. A luggage carrier assembly mountable externally on a vehicle comprising:
   a vertically extending first rigid frame of substantially rectangular configuration and having a substantially horizontally extending upper edge and a substantially horizontally extending lower edge;
   a second rigid frame of rectangular configuration secured to said first rigid frame adjacent the lower edge of said first rigid frame and extending substantially normal to said first frame in a horizontal direction; and
   panel means connected between said first rigid frame and said second rigid frame and forming a luggage-containing enclosure, said enclosure having four sides and a bottom, said panel means including:
   a flexible waterproof covering surrounding the interior of the luggage-containing enclosure and forming said four sides and said bottom extending between said four sides;
   semi-rigid wire mesh core elements lining but not joined to the inner sides of said waterproof covering;
   flexible inner fabric liners lining but not joined to the inner sides of said wire mesh core elements whereby said wire mesh core elements can be removed from between said flexible inner fabric liners and said flexible waterproof covering; and
   a closure subassembly pivotally secured to said first rigid frame adjacent the horizontally extending upper edge thereof and pivotable between a closure position across the open top of said luggage-containing enclosure, and spaced vertically above the bottom thereof, and an upwardly pivoted open position which permits luggage to be placed in, and removed from, said enclosure; and
   means for detachably mounting said first frame on the rear side of a vehicle at a location spaced upwardly from the bumper of the vehicle and spaced upwardly from the place where said first frame is joined to said second frame; and wherein said first frame includes a rigid sleeping and eating panel, and wherein said luggage carrier assembly is further characterized in that said means for mounting pivotally mounts said first and second frames and said panel means on the rear side of a vehicle for pivotation about a horizontal axis at said location so that said first frame and the rigid sleeping and eating panel can be pivoted into a horizontally extending position; and support means pivotally connected to said first rigid frame for supporting said assembly with respect to a surface supporting said vehicle to maintain said sleeping and eating panel in said horizontally extending position.

2. A luggage carrier assembly as defined in claim 1 wherein said closure subassembly includes:
   an arcuate top panel; and
   a pair of closure subassembly side panels having top edges secured to said top panel and extending in parallel planes.

3. A luggage carrier assembly as defined in claim 2 wherein said arcuate top panel subtends an angle of about 90° and includes:
   an arcuate semi-rigid wire mesh core element; and
   a flexible waterproof fabric covering having a first portion covering the outer side of said rigid wire mesh core element, and having a second portion formed continuously with said first portion covering the inner side of said rigid wire mesh core element.

4. A vehicle for transporting multiple passengers and luggage comprising:
   an automotive van having passenger seating mounted therein and including:
   a pair of cooperating, oppositely and rearwardly opening rear doors forming a major portion of the back wall of the van, and mounted on the van for pivotation about horizontally spaced, substantially vertically extending axes disposed toward opposite sides of the van;
   at least one hinge pivotally supporting and mounting each of said doors for enabling the described pivotation thereof to occur, each of said hinges being mounted at the outer side edge of one of said doors; and
   a horizontally extending bumper mounted on said van at a location below said doors and spaced above the ground upon which said van is supported; and
   a luggage carrier assembly defining a luggage-containing enclosure, and including:
   rigid, vertically extending frame means at the forward side of said luggage carrier assembly, said rigid, vertically extending frame means including a substantially horizontally extending lower edge and a flat, rigid sleeping and eating surface;
   clamp means pivotally connecting said rigid frame means to said bumper for pivotation of the frame means about a horizontal axis adjacent said lower edge, between a first, vertically extending, luggage carrying transport position, and a second, horizontally extending sleeping and eating position in which said first rigid sleeping and eating surface faces upwardly;
   flexible panel means connected to said rigid frame means and defining therewith, said luggage-containing enclosure;
   supporting means connected to either said rigid frame means or said flexible panel means and projecting therefrom into supporting contact with the ground when said frame means is in said second, horizontally extending sleeping and eating position, said supporting means cooperating with said bumper and said clamp means to support said frame means, panel means and any luggage carried in said luggage-containing enclosure out of contact with the ground; and means manually quick detachably connecting said rigid frame means to said hinges, and retaining said rigid frame means in said vertically extending position.

5. A vehicle for transporting multiple passengers and luggage as defined in claim 4 wherein said quick detachable connecting means comprises:

a pair of horizontally spaced sleeves each slidably mounted upon opposite sides of said rigid frame means for sliding adjustment in their vertical position along said frame and relative to said horizontally extending lower edge; and bolt means slidably and reciprocably mounted in said spaced sleeves and including a pair of spaced bolts each having one part passing through one of said sleeves, and a second part manually and detachably engageable with one of said door hinges.

6. A vehicle for transporting multiple passengers and luggage as defined in claim 4 wherein said supporting means comprises a pair of horizontally spaced legs foldable against said frame means into the plane of said flat, rigid sleeping surface, and foldable by downward pivotation to said frame means supporting position.

7. A vehicle for transporting multiple passengers and luggage as defined in claim 6 and further characterized as including rollers on said frame means permitting said luggage carrier assembly to be rolled horizontally when said rigid sleeping surface faces downwardly with said flexible panel means positioned thereabove.

8. A vehicle for transporting multiple passengers and luggage as defined in claim 4 wherein said clamp means includes a pair of horizontally spaced manually releasable clamps clampingly engaging said bumper and pivotably engaging said rigid frame means.

9. A vehicle for transporting multiple passengers and luggage as defined in claim 4 wherein said flexible panel comprises:

a continuous flexible fabric sheet forming a forward side, a rear side and a pair of opposed, parallel lateral sides of said luggage-containing enclosure; and a movable closure subassembly pivotally connected to said frame means.

10. A vehicle mountable luggage carrier assembly comprising:

a first rigid frame having an upper side edge and a lower side edge, said first rigid frame constituting a forward side of said luggage carrier assembly attachable directly to said vehicle;

a second rigid frame secured to, and projecting normal to, said lower side edge of said first rigid frame at a location adjacent said lower side edge thereof, and forming an L-shaped structure with said first rigid frame;

flexible panel means connected between said first and second rigid frames and forming an open-topped luggage-containing enclosure therewith;

means for pivotally connecting said frames and said flexible panel means to a vehicle bumper for pivotation about a horizontal axis to move said first frame between a substantially vertically extending transport position and a substantially horizontally extending position, while moving said second frame between a horizontally extending transport position and a second position extending downwardly from said vehicle bumper;

supporting legs pivotally secured to said first frame along said upper side edge thereof and pivotable from a horizontally extending position into a substantially vertical, downwardly extending, ground engaging position for supporting said first frame in said substantially horizontally extending position thereof; and means for manually detachably securing said first frame to a vehicle carrying said bumper so that said first frame is in a substantially vertically extending position.

11. A vehicle mountable luggage carrier assembly as defined in claim 10 wherein said flexible panel means comprises:

a pair of opposed, substantially parallel, horizontally spaced, substantially vertically extending, flexible fabric side panels each having:

a forward, vertically extending edge connected to said first rigid frame;

a lower edge connected to said second frame;

a rear edge extending substantially parallel to said forward, vertically extending edge and spaced rearwardly from said first rigid frame; and a top edge extending downwardly and rearwardly from said first rigid frame at an angle to the vertical to thereby facilitate access to the interior of such luggage-containing enclosure; and a substantially vertically extending, flexible fabric rear panel horizontally spaced rearwardly from said first rigid frame and having a pair of opposed, substantially parallel side edges connected to the rear edges of said flexible fabric side panels, said rear panel extending from the lower edge of each of said flexible fabric side panels to a position spaced upwardly therefrom; and wherein said luggage carrier assembly further comprises a closure assembly pivotally secured to said first rigid frame adjacent the upper side edge thereof, and pivotable from a first position of closure in which the closure subassembly extends across and closes the upwardly facing opening at the upper side of said luggage-containing enclosure, to a second, open position in which said closure subassembly is spaced upwardly from the top edges of said fabric side panels.

12. A vehicle mountable luggage carrier assembly as defined in claim 10 wherein said means for pivotally connecting said frames and panel means to a vehicle bumper comprises:

a pair of spaced clamping brackets each dimensioned for clamping to said vehicle bumper;

means for opening and closing each of said clamping brackets;

an apertured flanges projecting from each of said clamping brackets at a location closely adjacent a side of at least one of said frames so as to position said apertured flanges in horizontal alignment with each other on opposite sides of said frames and flexible panel means; and pin means projecting through apertures in said apertured flanges, and including two pivot pins disposed in horizontal alignment with each other, and in pivotal engagement with at least one of said frames.

13. A luggage carrying assembly as defined in claim 10 wherein said first frame has a rigid flat panel secured thereto in a position to form an upwardly facing surface when said first frame is pivoted into a horizontal position to thereby facilitate utilizing said rigid panel secured to said first frame as a sleeping surface or article-supporting surface.

14. A luggage carrying assembly as defined in claim 10 wherein said panel means includes:
   a plurality of interconnected panels forming a luggage carrying enclosure, said panels each including:
      a flexible, waterproof fabric positioned at the outer side of said enclosure with said flexible waterproof fabric panel elements interconnected to form a continuous external fabric enclosure of water tight integrity; and
      rigid lightweight metallic mesh elements positioned inside of each of said flexible fabric panel elements and facilitating protection of luggage carried within said enclosure against theft through an opening cut through said fabric panel elements.

15. A luggage carrying assembly as defined in claim 14 and further characterized as including rollers mounted on said second frame to facilitate rolling said luggage carrier assembly along the ground when said luggage carrier assembly is detached from a vehicle upon which it is mounted and rested upon said second frame.

16. A luggage carrier assembly mountable externally on a vehicle and including a forward side attachable to the vehicle and a rearward side spaced rearwardly from the vehicle and from the forward side of said assembly, the assembly comprising:
   a first rigid frame located at the forward side of said assembly for mounting to said vehicle;
   a second rigid frame connected to, and extending substantially normal to said first rigid frame;
   a pair of opposed, substantially parallel, substantially vertically extending side panels each having edges connected to said first and second rigid frames;
   a rear panel connected between said side panels and spaced rearwardly within said luggage carrier assembly from said first rigid frame; and
   a top closure subassembly forming an enclosure with said first and second frames, side panels and rear panel;
   rollers on said first rigid frame whereby said luggage carrier assembly may be rolled along on upwardly facing supporting surfaces, such as a driveway, street or the like, when said first rigid frame extend substantially horizontally and is detached from a vehicle; and
   means for detachably supporting said luggage carrier assembly on the rear side of a vehicle with said first frame extending substantially parallel to the rear of the vehicle, and with said second frame extending away from the vehicle; and
   means for pivotally connecting said first rigid frame to the rear bumper of a vehicle for pivotation about a horizontal axis, said means for pivotally connecting including a pair of horizontally spaced clamps located on the opposite sides of said first frame and further including pin means for pivotally engaging said first frame at a location on the opposite side of the rollers carried thereon from said clamps.

17. A luggage carrier assembly mountable externally on a vehicle comprising:
   a vertically extending first rigid frame of substantially rectangular configuration and having a substantially horizontally extending upper edge and a substantially horizontally extending lower edge;
   a sleeping and eating panel secured to said first rigid frame and extending in a vertical direction when said first rigid frame extends vertically;
   clamping means detachably and pivotally supporting said first rigid frame on said vehicle for pivotation between a first, vertically extending, transport position, and a second, horizontally extending, sleeping and eating position;
   support means pivotally connected to said first rigid frame for supporting said first rigid frame in said horizontally extending sleeping and eating position, said support means including at least one elongated support structure having one of its ends pivotally connected to said first rigid frame and pivotable between a horizontally extending stored position when said first rigid frame is in said first, vertically extending transport position, and a downwardly extending, vertically oriented direction when said first rigid frame projects in said horizontally extending sleeping and eating position;
   a second rigid frame of rectangular configuration secured to said first rigid frame adjacent the lower edge of said first rigid frame and extending substantially normal to said first rigid frame in a horizontal direction when said first rigid frame extends vertically; and
   panel means connected between said first rigid frame and said second rigid frame and forming with said rigid frames, a luggage-containing enclosure having sides surrounding the enclosure and a bottom, said panel means including:
      a flexible waterproof covering surrounding the interior of the luggage-containing enclosure at its surrounding sides and at the bottom;
      semi-rigid wire mesh core elements lining the inner sides of said waterproof covering;
      flexible inner fabric covers lining the inner sides of said wire mesh core elements; and
      a closure subassembly pivotally secured to said first rigid frame adjacent the horizontal extending upper edge thereof and pivotable between a closure position across the top of said luggage-containing enclosure, and an upwardly pivoted open position in which luggage can be placed in, and removed from, said enclosure; and
   means cooperating with said clamping means for detachably mounting said first frame on the rear side of a vehicle.

18. A vehicle for transporting multiple passengers and luggage comprising:
   an automotive van having passenger seating mounted therein and including:
      a pair of cooperating, oppositely and rearwardly opening rear doors forming a major portion of the back wall of the van and mounted on the van for pivotation about horizontally spaced, substantially vertically extending axes disposed toward opposite sides of the van;
      at least one hinge pivotally supporting and mounting each of said doors for enabling the described pivotation thereof to occur, each of said hinges being mounted at the outer side edge of one of said doors; and a horizontally extending bumper mounted on said van at a location below said doors and spaced above the ground upon which said van is supported; and a luggage carrier assembly defining a luggage-containing enclosure, and including:

rigid, vertically extending frame means at the forward side of said luggage carrier assembly, said rigid, vertically extending frame means including a substantially horizontally extending lower edge and a flat, rigid sleeping surface;

clamp means pivotally connecting said rigid frame means to said bumper for pivotation of the frame means about a horizontal axis adjacent said lower edge, between a first, vertically extending, luggage carrying transport position, and a second, horizontally extending sleeping position in which said flat rigid sleeping surface faces upwardly;

flexible panel means connected to said rigid frame means and defining therewith, said luggage-containing enclosure;

supporting means connected to said rigid frame means and projecting therefrom into supporting contact with the ground when said frame means is in said second, horizontally extending sleeping position, said supporting means cooperating with said bumper and said clamp means to support said frame means, panel means and any luggage carried in said luggage-containing enclosure, out of contact with the ground; and means manually quick detachably connecting said rigid frame means to said hinges, and retaining said rigid frame means in said vertically extending position, said detachable connecting means comprising:

a pair of horizontally spaced sleeves each slidably mounted upon opposite sides of said rigid frame means for sliding adjustment in their vertical position along said frame means and relative to said horizontally extending lower edge; and bolt means slidably and reciprocably mounted in said spaced sleeves and including a pair of spaced bolts each having one part passing through one of said sleeves, and a second part manually and detachably engageable with one of said door hinges.

19. A vehicle for transporting multiple passengers and luggage comprising:

an automotive van having passenger seating mounted therein and including:

a pair of cooperating, oppositely and rearwardly opening rear doors forming a major portion of the back wall of the van and mounted on the van for pivotation about horizontally spaced, substantially vertically extending axes disposed toward opposite sides of the van;

at least one hinge pivotally supporting and mounting each of said doors for enabling the described pivotation thereabout to occur, each of said hinges being mounted on the outer side edge of one of the doors; and a horizontally extending bumper mounted on said van at a location below said doors and spaced above the ground upon which said van is supported; and a luggage carrier assembly defining a luggage-containing enclosure, and including:

rigid, vertically extending frame means at the forward side of said luggage carrier assembly, said rigid vertically extending frame means including a substantially horizontally extending lower edge and a flat, rigid sleeping surface;

clamp means pivotally connecting said rigid frame means to said bumper for pivotation of the frame means about a horizontal axis adjacent said lower edge, between a first, vertically extending, luggage carrying transport position, and a second, horizontally extending sleeping position in which said flat rigid sleeping surface faces upwardly;

flexible panel means connected to said rigid frame means and defining therewith, said luggage-containing enclosure;

supporting means connected to said rigid frame means projecting therefrom into supporting contact with the ground when said frame means is in said second, horizontally extending sleeping and eating position, said supporting means cooperating with said bumper and said clamp means to support said frame means, panel means and any luggage carried in said luggage-containing enclosure out of contact with the ground, said supporting means comprising a pair of horizontally spaced legs foldable against said frame means into the plane of said flat, rigid sleeping surface, and foldable by downward pivotation to said frame means supporting position;

rollers mounted on said frame means permitting said luggage carrier assembly to be rolled horizontally when said rigid sleeping and eating surface faces downwardly with said flexible panel means positioned thereabove; and means manually quick detachably connecting said rigid frame means to said hinges, and retaining said rigid frame means in said vertically extending position.

20. A vehicle for transporting passengers and luggage comprising:

an automotive van having passenger seating mounted therein and including:

a pair of cooperating, oppositely opening doors forming a major portion of the back wall of the van, and mounted on the van for pivotation about a horizontally spaced, substantially vertically extending axes disposed toward opposite sides of the van;

at least one hinge pivotally supporting and mounting each of said doors for enabling the described pivotation thereof to occur, each of said hinges being mounted at the outer side edges of one of said doors; and a horizontally extending bumper mounted on said van at a location below said doors and spaced above the ground upon which said van is supported; and a luggage carrier assembly defining a luggage-containing enclosure, and including:

a rigid, vertically extending frame means at the forward side of said luggage carrier assembly, said rigid, vertically extending frame means including a substantially horizontally extending lower edge and a flat, rigid eating surface;

clamp means pivotally connecting said rigid frame means to said bumper for pivotation of the frame means about a horizontal axis adjacent said lower edge of said frame means, between a first, vertically extending, luggage carrying transport position, and a second, horizontally extending position in which said flat, rigid eating surface faces upwardly, said clamp means including a pair of horizontally spaced, manually releasable clamps clampingly engaging said bumper and pivotally engaging said rigid frame means;

flexible panel means connected to said rigid frame means and defining therewith, said luggage-containing enclosure;

supporting means connected to one of said rigid frame means and said flexible panel means and projecting therefrom into supporting contact with the ground when said frame means is in said second, horizontally extending position, said supporting means cooperating with said bumper, and with said clamp mans to support said frame means, panel means and any luggage carried in said luggage-containing enclosure out of contact with the ground; and means manually quick detachably connecting said rigid frame means to said hinges, and retaining said rigid frame means in said vertically extending position.

21. A vehicle for transporting luggage while defining a space inside the vehicle for transporting additional luggage or passengers, said vehicle comprising:

an automotive van defining a space on the inside thereof for carrying passengers, luggage, or both, and including:

a pair of cooperating, oppositely opening rear doors forming a major portion of the back wall of the van, and mounted on the van for pivotation about horizontally spaced, substantially vertically extending axes toward opposite sides of the van;

a at least one hinge pivotally supporting and mounting each of said doors for enabling the described pivotation thereof to occur, each of said hinges being mounted on the outer side edge of one of said doors; and a horizontally extending bumper mounted on said van at the location below said doors and spaced above the ground upon which said van is supported; and a luggage carrier assembly defining a luggage-containing enclosure, and including:

rigid, vertically extending frame means at the forward side of said luggage carrier assembly, said rigid, vertically extending frame means including a substantially horizontally extending lower edge and a flat, rigid eating surface;

clamp means pivotally connecting said frame means to said bumper for pivotation of the frame means about a horizontal axis adjacent said lower edge, between a first, vertically extending, luggage carrying transport position, and a second, horizontally extending position in which said flat, rigid eating surface faces upwardly;

flexible panel means connected to said rigid frame means and defining therewith, said luggage-containing enclosure, said flexible panel means comprising:

a continuous flexible fabric sheet forming a forward side, a rear side and a pair of opposed lateral sides of said luggage-containing enclosure;

a movable closure subassembly pivotally connected to said frame means for pivotation about a horizontal pivotal axis between open and closed positions;

means connected to said rigid frame means for supporting said frame means, panel means and any luggage carried in said luggage-containing enclosure out of contact with the ground, said supporting means projecting from said frame means into contact with the ground when said frame means is in said second, horizontally extending position and cooperating with said bumper and said clamp means to support said frame means, panel means and luggage carried in said luggage-containing enclosure out of contact with the ground; and means manually quick detachably connecting said rigid frame means to said hinges, and retaining said rigid frame means in said vertically extending position.

22. A vehicle mountable luggage carriage assembly comprising:

a first rigid frame;

a second rigid frame secured to, and projecting normal to, one side of said first rigid frame, and at a location adjacent one side edge thereof;

panel means connected between said first and second rigid frames and forming a luggage-containing enclosure having said first rigid frame as the forward side thereof, and mountable to a vehicle, which panel means includes:

a pair of opposed, substantially vertically extending side panels;

a rear panel connected between said side panels having one side edge connected to said second rigid frame; and a closure subassembly pivotally connected to said first rigid frame for pivotation along a first horizontal axis spaced from the location at which said second rigid frame is connected to said first rigid frame, said closure subassembly being mounted for pivotation about said first horizontal axis from a first position of cooperation with said panels to close said luggage-containing enclosure, to a second elevated position to open said luggage-containing enclosure and facilitate access to the interior thereof for loading and unloading luggage;

means for connecting said first rigid frame, said second rigid frame and the panel means connected therebetween to a vehicle for pivotation about a second horizontal axis extending substantially parallel to the ground for pivotation from a first transport position, in which said first rigid frame extends substantially vertically and substantially parallel to a vertical side wall of said vehicle, to a second, horizontally extending supporting position in which said first rigid frame extends horizontally and substantially parallel to the ground, and in which second position said second rigid frame extends substantially vertically from its line of joinder to said first rigid frame downwardly toward the ground; and means for detachably retaining said first and second rigid frames and said panel means connected therebetween in said first position in which said first frame extends vertically and substantially parallel to a vertical side wall of said vehicle, said means for detachably retaining said first and second rigid frames and said panel means in said first position comprising a pair of clamp bolt subassemblies adapted to releasably bolt said frame to rear door hinges located at the opposed side edges of the rear doors of a van.

23. A vehicle mountable luggage carrier assembly as defined in claim 22 wherein said first frame includes:
a pair of opposed horizontally spaced lateral side edges extending substantially normal to said one side edge; and
wherein each of said clamp bolt subassemblies comprises:
a pair of horizontally spaced sleeves, each slidably mounted to one lateral edge of said first frame;
an L-shaped bolt having a first leg and further having a second leg extending at a right angle to said first leg and through said sleeve, said second leg having external threads therearound; and
a nut engageable with the threads of said second leg and bearing against said sleeve so that when said nut is turned on said threads, said second leg will be drawn through said sleeve and said first leg will be drawn toward said sleeve.

24. A vehicle mountable luggage carriage assembly as defined in claim 23 and further characterized as including supporting means connected to said first rigid frame and spaced from said second rigid frame and cooperating with said connecting means for supporting said first rigid frame at a substantially horizontally extending predetermined height above the ground when said frame are in said second position.

25. A vehicle mountable luggage carriage assembly as defined in claim 24 and further characterized as including rollers rollably mounted on said second rigid frame for rollably supporting the luggage carriage assembly when it is demounted from a vehicle by disconnection of said connecting means, and detachment of said retaining means.

26. A vehicle mountable luggage carriage assembly comprising:
a first rigid frame;
a second rigid frame secured to, and projecting normal to, one side of said first rigid frame, and at a location adjacent one side edge thereof;
panel means connected between said first and second rigid frames and forming a luggage containing enclosure having said first rigid frame as the forward side thereof and mountable to a vehicle, which panel means includes:
a pair of opposed, substantially vertically extending side panels;
a rear panel connected between said side panels and having one side edge connected to said second rigid frame; and
a closure subassembly pivotally connected to said first rigid frame for pivotation along a first horizontal axis spaced from the location at which said second rigid frame is connected to said first rigid frame, said closure subassembly being mounted for pivotation about said first horizontal axis from a first position of cooperation with said panels to close said luggage containing enclosure, to a second, elevated position to open said luggage containing enclosure and facilitate access to the interior thereof for loading and unloading luggage;

means for connecting said first rigid frame, said second rigid frame and the panel means connected therebetween to a vehicle for pivotation about a second horizontal axis extending substantially parallel to the ground for pivotation from a first transport position in which said first rigid frame extends substantially vertically and substantially parallel to a vertical side wall of said vehicle, to a second, horizontally extending supporting position in which said first rigid frame extends horizontally and substantially parallel to the ground, and in which second position said second rigid frame extends substantially vertically from its line of joinder to said first rigid frame downwardly toward the ground; and means for detachably retaining said first and second rigid frames and said panel means connected therebetween in said first position in which said first frame extends vertically and substantially parallel to a vertical side wall of said vehicle, said retaining means comprising at least one clamp bolt subassembly adapted to releasably bolt said frames to a vehicle for transport; and supporting means connected to said first rigid frame and spaced from said second rigid frame and cooperating with said connecting means for supporting said first rigid frame at a substantially horizontally extending, predetermined height above the ground when said first and second frames are in said second position, said supporting means comprising at least one leg pivotally connected to said first rigid frame.

27. A vehicle mountable luggage carriage assembly comprising:
a first rigid frame;
a second rigid frame secured to, and projecting normal to, one side of said first rigid frame, and at a location adjacent one side edge thereof;
panel means connected between said first and second rigid frames and forming a luggage containing enclosure having said first rigid frame as the forward side thereof and mountable to a vehicle, which panel means includes:
a pair of opposed, substantially vertically extending side panels;
a rear panel connected between said side panels and having one side edge connected to said second rigid frame; and
a closure subassembly pivotally connected to said first rigid frame for pivotation along a first horizontal axis spaced from the location at which said second rigid frame is connected to said first rigid frame, said closure subassembly being mounted for pivotation about said first horizontal axis from a first position of cooperation with said panels to close said luggage containing enclosure, to a second, elevated position to open said luggage containing enclosure and facilitate access to the interior thereof for loading and unloading luggage;

means for connecting said first rigid frame, said second rigid frame and the panel means connected therebetween to a vehicle for pivotation about a second horizontal axis extending substantially parallel to the ground for pivotation from a first, transport position in which said first rigid frame extends substantially vertically and substantially parallel to a vertical side wall of said vehicle, to a second, horizontally extending supporting position in which said first rigid frame extends horizontally and substantially parallel to the ground to define a sleeping and eating panel thereon, and in which second position said second rigid frame extends substantially vertically from its line of joinder to said first rigid frame downwardly toward the ground; and means for detachably retaining said first and second rigid frames and said panel means connected therebetween in said first position in which said first frame extends vertically and substantially parallel to a vertical side wall of said vehicle; and rollers rollably mounted on said second rigid frame for rollably supporting the luggage carriers assembly when it is demounted from a vehicle by disconnection of said connecting means, and detachment of said retaining means; and support means pivotally connected to said first rigid frame for supporting said assembly with respect to a surface supporting said vehicle to maintain said sleeping and eating panel in said horizontally extending position.

28. A vehicle mountable luggage carriage assembly as defined inn claim 27 and further characterized as including a second group of rollers rollably mounted on said first rigid frame.

29. A vehicle mountable luggage carriage assembly comprising:
a first rigid frame;
a second rigid frame secured to, and projecting normal to, one side of said first rigid frame, and at a location adjacent one side edge thereof;
panel means connected between said first and second rigid frames and forming a luggage containing enclosure having said first rigid frame as the forward side thereof and mountable to a vehicle, which panel means includes:
a pair of opposed, substantially vertically extending side panels;
a rear panel connected between said side panels and having one side edge connected to said second rigid frame; and
a closure subassembly pivotally connected to said first rigid frame for pivotation along a first horizontal axis spaced from the location at which said second rigid frame is connected to said first rigid frame, said closure subassembly being mounted for pivotation about said first horizontal axis from a first position of cooperation with said panels to close said luggage containing enclosure, to a second, elevated position to open said luggage-containing enclosure and facilitate access to the interior thereof for loading and unloading luggage;
means for connecting said first rigid frame, said second rigid frame and the panel means connected therebetween to a vehicle for pivotation about a second horizontal axis extending substantially parallel to the ground for pivotation from a first, transport position in which said first rigid frame extends substantially vertically and substantially parallel to a vertical side wall of said vehicle, to a second, substantially horizontally extending supporting position in which said first rigid frame extends horizontally and substantially parallel to the ground, and in which second position said second rigid frame extends substantially vertically from its line of joinder to said first rigid frame downwardly toward the ground, said connecting means comprising:
a pair of spaced clamping brackets each dimensionally adapted for clamping onto a vehicle rear bumper at spaced locations therealong;
means for opening and closing each of said clamping brackets;
an apertured flange projecting rearwardly from each of said clamping brackets in a direction which is rearwardly from a bumper to which said clamping brackets are attached and at a location closely adjacent the opposite sides of at least one of said frames so as to position said apertured flanges in horizontal alignment with each other on opposite sides of said frames and said flexible panel means, each of said apertured flanges having a plurality of apertures therein to facilitate selective mounting of said frames in said flanges; and
pin means projecting through selected apertures in each of said apertured flanges, and including two pivot pins disposed in horizontal alignment with each other and in pivotal engagement with at least one of said frames whereby the pivotation of said frames about said second horizontal axis is facilitated;
means for detachably retaining said first and second rigid frames and said panel means connected therebetween in said first position in which said first frame extends vertically and substantially parallel to a vertical side wall of said vehicle, said detachable retaining means comprising at least one clamp bolt subassembly spaced along said first frame from said connecting means and adapted to engage said vehicle vertical side wall.

30. A vehicle mountable luggage carriage assembly comprising:
a first rigid frame;
a second rigid frame secured to, and projecting normal to, one side of said first rigid frame, and at a location adjacent one side edge thereof;
panel means connected between said first and second rigid frames and forming a luggage-containing enclosure having said first rigid frame as the forward side thereof and mountable to a vehicle, which panel means includes:
a pair of opposed, substantially vertically extending side panels;
a rear panel connected between said side panels and having one side edge connected to said second rigid frame; and
a closure subassembly pivotally connected to said first rigid frame for pivotation along a first horizontal axis spaced from the location at which said second rigid frame is connected to said first rigid frame, said closure subassembly being mounted for pivotation about said first horizontal axis from a first position of cooperation with said panels to close said luggage-containing enclosure, to a second, elevated position to open said luggage-containing enclosure and facilitate access to the interior thereof for loading and unloading luggage;

means for connecting said first rigid frame, said second rigid frame and the panel means connected therebetween to a vehicle for pivotation about a second horizontal axis extending substantially parallel to the ground for pivotation from a first transport position, in which said first rigid frame extends substantially vertically and substantially parallel to a vertical side wall of said vehicle, to a second, horizontally extending supporting position in which said first rigid frame extends horizontally and substantially parallel to the ground, and in which second position said second rigid frame extends substantially vertically from its line of joinder to said first rigid frame downwardly toward the ground; and means for detachably retaining said first and second rigid frames and said panel means connected therebetween in said first position in which said first frame extends vertically and substantially parallel to a vertical side wall of said vehicle;

supporting means connecting to said first rigid frame and spaced from said second rigid frame and cooperating with said connecting means for supporting said first rigid frame at a substantially horizontally extending predetermined height above the ground when said frames are in said second position, said supporting means comprising at least one leg pivotally connected to said rigid frame and positioned immediately adjacent said closure assembly so that when said leg is pivoted to said frame-supporting position, said closure subassembly is prevented from moving from said first position toward said second, elevated position.

31. A vehicle mountable luggage carriage assembly comprising:

a first rigid frame;

a second rigid frame secured to, and projecting normal to, one side of said first rigid frame, and at a location adjacent one side edge thereof;

panel means connected between said first and second rigid frames and forming a luggage-containing enclosure having said first rigid frame as the forward side thereof and mountable to a vehicle, which panel means includes:

a pair of opposed, substantially vertically extending side panels;

a rear panel connected between said side panels and having one side edge connected to said second rigid frame; and a closure subassembly pivotally connected to said first rigid frame for pivotation along a first horizontal axis spaced from the location at which said second rigid frame is connected to said first rigid frame, said closure subassembly being mounted for pivotation about said first horizontal axis from a first position of cooperation with said panels to close said luggage-containing enclosure, to a second, elevated position to open said luggage-containing enclosure and facilitate access to the interior thereof for loading and unloading luggage;

means for connecting said first rigid frame, said second rigid frame and the panel means connected therebetween to a vehicle for pivotation about a second horizontal axis extending substantially parallel to the ground for pivotation from a first transport position, in which said first rigid frame extends substantially vertically and substantially parallel to a vertical side wall of said vehicle, to a second, horizontally extending supporting position in which said first rigid frame extends horizontally and substantially parallel to the ground, and in which second position said second rigid frame extends substantially vertically from its line of joinder to said first rigid frame downwardly toward the ground;

means for detachably retaining said first and second rigid frames and said panel means connected therebetween in said first position in which said first frame extends vertically and substantially parallel to a vertical side wall of said vehicle;

means for locking said closure subassembly to said rear panel when said closure subassembly is in said first position of cooperation with said side panels and rear panel to close said luggage-containing enclosure; and support means pivotally attached to one of said frames and pivotable between a folded, transport position and an extended, load-supporting position.

32. A vehicle mountable luggage carriage assembly comprising:

a first rigid frame comprising:

steel frame elements interconnected to each other and extending around the periphery of said first rigid frame; and a wooden panel within, and supported by, said steel frame elements and forming a horizontally extending sleeping, dining and sitting surface when said rigid frame is in said second horizontally extending position;

a second rigid frame secure to, and projecting normal to, one side of said first rigid frame, and at a location adjacent one side edge thereof;

panel means connected between said first and second rigid frames and forming a luggage-containing enclosure having said first rigid frame as the forward side thereof and mountable to a vehicle, which panel means includes:

a pair of opposed, substantially vertically extending side panels;

a rear panel connected between said side panels and having one side edge connected to said second rigid frame; and a closure subassembly pivotally connected to said first rigid frame for pivotation along a first horizontal axis spaced from the location at which said second rigid frame is connected to said first rigid frame, said closure subassembly being mounted for pivotation about said first horizontal axis from a first position of cooperation with said panels to close said luggage-containing enclosure, to a second, elevated position to open said luggage-containing enclosure and facilitate access to the interior thereof for loading and unloading luggage;

means for connecting said first rigid frame, said second rigid frame and the panel means connected therebetween to a vehicle for pivotation about a second horizontal axis extending substantially parallel to the ground for pivotation from a first transport position, in which said first rigid frame extends substantially vertically and substantially parallel to a vertical side wall of said vehicle, to a second, substantially horizontally extending supporting position in which said first rigid frame extends horizontally and substantially parallel to the ground, and in which second position said second rigid frame extends substantially vertically from its line of joinder to said first rigid frame downwardly toward the ground; and means for detachably retaining said first and second rigid frames and said panel means connected therebetween in said first position in which said first frame extends vertically and substantially parallel to a vertical side wall of said vehicle, said means for detachably retaining comprising a pair of clamp bolt subassemblies adapted to releasably bolt said first frame to rear door hinges located at opposed side edges of the rear doors of a vehicle.

33. A luggage carrier assembly mountable externally on a vehicle comprising:

a vertically extending first rigid frame of substantially rectangular configuration and having a substantially horizontally extending upper edge and a substantially horizontally extending lower edge;

a second rigid frame of rectangular configuration secured to said first rigid frame adjacent the lower edge of said first rigid frame and extending substantially normal to said first frame in a horizontal direction when said first rigid frame extends vertically;

panel means connected between said first rigid frame and said second rigid frame and forming a luggage-containing enclosure, said enclosure having four sides and a bottom extending between said four sides, said four sides including a forward side, a pair of opposed, parallel lateral sides, an open top and a rear side, said panel means including:

a flexible, waterproof covering surrounding the interior of the luggage-containing enclosure and forming said four sides and said bottom extending between said four sides, said four sides comprising a pair of parallel lateral sides and a rear side;

semi-rigid wire mesh core elements lining, but not joined to, inner sides of said waterproof covering at the location of said parallel lateral sides and said rear side;

flexible inner fabric liners lining, but not joined to, the inner sides of said wire mesh core elements;

a closure subassembly pivotally secured to said first rigid frame adjacent the horizontally extending upper edge thereof, and pivotable between a closure position across the open top of said luggage-containing enclosure, and spaced vertically above the bottom thereof, and an upwardly pivoted, open position in which luggage can be placed in, and removed from, said enclosure; and means for detachably mounting said first rigid frame on the rear side of a vehicle at a location spaced upwardly from the bumper of the vehicle, and spaced upwardly from the plane where said first frame is joined to said second frame;

a sleeping and eating panel secured to said first rigid frame and extending in a vertical direction when said first rigid frame extends vertically;

clamping means detachably and pivotally supporting said first rigid frame on said vehicle for pivotation about a horizontally extending axis located below the location of said means for detachably mounting said first frame on the rear side of the vehicle for pivotation about said horizontal between a first, vertically extending transport position, and, after said detachable mounting means has been detached, a second, horizontally extending sleeping and eating position; and support means pivotally connected to said first rigid frame and cooperating with said clamping means for supporting said first rigid frame in said second, horizontally extending sleeping and eating position, said support means including at least one elongated support structure having one end pivotally connected to said first rigid frame.

34. A luggage carrier assembly mountable externally on a vehicle comprising:

a vertically extending first rigid frame of substantially rectangular configuration and having a substantially horizontally extending upper edge and a substantially horizontally extending lower edge;

a sleeping and eating panel secured to said first rigid frame and extending in a vertical direction when said first rigid frame extends vertically;

clamping means detachably and pivotally supporting said first rigid frame on said vehicle for pivotation between a first, vertically extending transport position, and a second, horizontally extending sleeping and eating position;

support means pivotally connected to said first rigid frame for supporting said first rigid frame in said horizontally extending sleeping and eating position;

a second rigid frame of rectangular configuration secured to said first rigid frame adjacent the lower edge of said first rigid frame and extending substantially normal to said first rigid frame in a horizontal direction when said first rigid frame extends vertically; and panel means connected between said first rigid frame and said second rigid frame and forming, with said rigid frames, a luggage-containing enclosure having sides surrounding the enclosure and having a bottom, said panel means including:

a one piece, flexible waterproof covering surrounding the interior of the luggage-containing enclosure at its surrounding sides and at the bottom;

semi-rigid wire mesh core elements lining the inner sides of said waterproof covering;

flexible inner fabric covers lining the inner sides of said wire mesh core elements; and a closure subassembly pivotally secured to said first rigid frame adjacent the horizontally extending upper edge thereof and pivotable between a closure position across the top of said luggage-containing enclosure, and an upwardly pivoted, open position in which luggage can be placed in, and removed from, said enclosure; and means cooperating with said clamping means for detachably mounting said first frame on the rear side of a vehicle, said means cooperating with said clamping means comprising:

a pair of horizontally spaced clamp bolt subassemblies, each of said clamp bolt subassemblies including:

a rigid sleeve;

an externally threaded clamp bolt having an elongated portion extending through said sleeve;

means for reciprocating said clamp bolt within said rigid sleeve; and a nut engaging the threads of said elongated portion of said clamp bolt to lock the position of said clamp bolt relative to said sleeve after a portion of said clamp bolt has engaged appendages on said vehicle to detachably mount said first frame on said vehicle.

35. A luggage carrier assembly as defined in claim 34 wherein said clamping means comprises:
   a plurality of horizontally spaced clamping brackets;
   a flange plate projecting vertically from each of said clamping brackets, each of said flange plates defining a plurality of vertically spaced pin apertures therethrough; and
   a pivot pin associated with each of said flange plates and extending horizontally through one of said pin apertures into pivotal and supporting engagement with said first rigid frame.

36. A vehicle mountable luggage carriage assembly comprising:
   rigid frame means including a flat, rigid eating and sleeping member, and adapted to move between a first, vertically extending transport position and a second, horizontally extending eating and sleeping position;
   panel means mounted on said frame means and forming a luggage-containing enclosure, said panel means including:
      a pair of opposed, substantially parallel side panels;
      a rear panel,
      a bottom; and
      a closure subassembly pivotally connected to said rigid frame means for pivotation along a first horizontal axis adjacent the upper edges of said side panels of said panel means, said closure subassembly being mounted for pivotation about said first horizontal axis from a first position of cooperation with said side panels and rear panel to close said luggage-containing enclosure, to a second elevated position to open said luggage-containing enclosure and facilitate access to the interior thereof for loading and unloading luggage;
   means for connecting said rigid frame means and said panel means mounted thereon to a vehicle of the type having a horizontally extending rear bumper and an upwardly extending rear wall extending upwardly substantially vertically from said rear bumper, said connecting means being adapted to connect said rigid frame means and said panel means for pivotation about a second horizontal axis extending substantially parallel to the ground for pivotation from a first transport position, in which said flat rigid and sleeping member of said rigid frame means extends substantially vertically and substantially parallel to the rear wall of said vehicle, to a second, horizontally extending supporting position in which said flat rigid eating and sleeping member extends substantially horizontally and generally parallel to the ground;
   means for detachably retaining said rigid frame means and said panel means mounted thereon in said first position in which said flat eating and sleeping member extends vertically and substantially parallel to said rear wall of the vehicle, said retaining means including a pair of horizontally spaced, clamp bolt subassemblies adapted to releasably bolt said rigid frame means and the panel means mounted thereon to the rear wall of the vehicle;
   supporting means connected to said rigid frame means and cooperating with said connecting means for supporting said rigid frame means and said panel means mounted thereon so that said flat rigid eating and sleeping member extends substantially horizontally at a predetermined height above the ground when said frame means is in said second position, said supporting means comprising at least two spaced legs each pivotally connected at one of its ends to said rigid frame means and positioned immediately adjacent said closure assembly, said spaced legs being pivotable from a horizontally extending first position across the upper side of said frame means at a time when said frame means is in a transport position in which said flat rigid eating and sleeping member extends vertically, to a supporting second position in which said two spaced legs are pivoted so as to extend vertically downwardly from said frame means and support said frame means in an attitude such that said flat rigid eating and sleeping member extends substantially horizontally.

37. A vehicle mountable luggage carrier assembly comprising:
   frame means including:
      a forward, vertically extending portion; and
      a substantially horizontally extending portion projecting rearwardly from the lower part of said forward, vertically extending portion;
   a flexible waterproof covering extending around said frame means and forming an open top luggage-containing enclosure;
   closure means pivotally connected to said rigid frame means for pivoting about a substantially horizontal axis between a closure position in which said closure means cooperates with said flexible waterproof covering to close the opening at the top of said luggage-containing enclosure, and an open position in which said closure means pivots upwardly to open the top of said luggage-containing enclosure to facilitate the insertion and removal of luggage therefrom;
   bumper connection means for connecting the lower portion of said rigid frame means to a vehicle for pivotation about a horizontal axis so that said frame means can be pivoted between a first position, in which said vertically extending portion extends vertically and adjacent the rear of a vehicle to which said vehicle mountable luggage carriage assembly is mounted, and a second position in which said forward, vertically extending portion is pivoted downwardly to a position in which it extends substantially horizontally;
   means for detachably connecting said frame means to the vehicle with said detachably connecting means located on said frame means at a location spaced upwardly on said vertically extending portion from said bumper connection means, said means for detachably connecting said frame means cooperating with said bumper connection means to retain said rigid frame means in a fixed travel position on a vehicle in which said forward vertically extending portion extends vertically;
   first rollers carried on the horizontally projecting portion of said frame means to permit said frame means to be optionally rested on, and rolled on said rollers when said rigid frame means and flexible waterproof covering are disconnected from a vehicle by disconnection of said bumper connection means, and disconnection of said means for detachably connecting the frame means to a vehicle at a location above the lower portion of said frame means; and second rollers carried on the vertically extending portion of said frame means to permit said frame means to be optionally rested on said second rollers and rolled on an upwardly facing surface when said frame means and flexible waterproof covering are disconnected from a vehicle by disconnection of said bumper connection means, and disconnection of said means for detachably connecting the frame means to a vehicle at a location above the lower portion of said frame means.

38. A vehicle mountable luggage carriage assembly comprising:

a first rigid frame;

a second rigid frame secured to, and projecting normal to, one side of said first rigid frame, and at a location adjacent one side edge thereof;

panel means connected between said first and second rigid frames, and forming a luggage containing enclosure having said first rigid frame as the forward side thereof and mountable to a vehicle, which panel means includes a pair of opposed, substantially vertically extending side panels and further includes:

a rear panel connected between said side panels and having one edge connected to said second rigid frame; and a closure subassembly pivotally connected to said first rigid frame for pivotation along a horizontal axis spaced from the location at which said second rigid frame is connected to said first rigid frame, said closure subassembly being mounted for pivotation about said horizontal axis from a first position of cooperation with said panels to close said luggage containing enclosure, to a second, elevated position to open said luggage containing enclosure and facilitate access to the interior thereof for loading and unloading luggage;

means for connecting said first rigid frame, said second rigid frame and the panel means connected therebetween to a vehicle for pivotation about a horizontal axis extending substantially parallel to the ground for pivotation from a first transport position, in which said first rigid frame extends substantially vertically and substantially parallel to a vertical side wall of said vehicle, to a second, horizontally extending supporting position, in which said first rigid frame extends horizontally and substantially parallel to the ground, and in which second position said second rigid frame extends substantially vertically from its line of joinder to said first rigid frame downwardly toward the ground; and means for detachably retaining said first and second rigid frames and said panel means connected therebetween in said first position in which said first frame extends vertically and substantially parallel to a vertical side wall of said vehicle; and support means pivotally attached to one of said frame for pivotation between a folded, transport position, and an extended, load-supporting position.

* * * * *

UNITED STATES PATENT AND TRADEMARK OFFICE
CERTIFICATE OF CORRECTION

PATENT NO. : 4,907,728
DATED : March 13, 1990
INVENTOR(S) : Allen L. Giblet

It is certified that error appears in the above-identified patent and that said Letters Patent is hereby corrected as shown below:

In the Claims:

In Column 18, line 61, delete "first" and insert -flat-.
In Column 21, line 55, add a -s- to the word extend.
In Column 24, line 52, delete "a"

In Column 25, line 23, delete "mans" and insert -means-.
In Column 29, line 31, delete "inn" and insert -in-.

Signed and Sealed this

Twenty-first Day of May, 1991

Attest:

HARRY F. MANBECK, JR.

Attesting Officer

Commissioner of Patents and Trademarks